United States Patent
Darr et al.

(10) Patent No.: US 9,392,746 B2
(45) Date of Patent: Jul. 19, 2016

(54) ARTIFICIAL INTELLIGENCE FOR DETECTING AND FILLING VOID AREAS OF AGRICULTURAL COMMODITY CONTAINERS

(71) Applicants: Deere & Company, Moline, IL (US); Iowa State University Research Foundation, Inc., Ames, IA (US)

(72) Inventors: Matthew J. Darr, Ames, IA (US); Robert McNaull, Ames, IA (US); John Kruckeberg, Williamsport, TN (US); Zachary T. Bonefas, Urbandale, IA (US)

(73) Assignees: DEERE & COMPANY, Moline, IL (US); IOWA STATE UNIVERSITY RESEARCH FOUNDATION, INC., Ames, IA (US)

(*) Notice: Subject to any disclaimer, the term of this patent is extended or adjusted under 35 U.S.C. 154(b) by 263 days.

(21) Appl. No.: 14/041,252

(22) Filed: Sep. 30, 2013

(65) Prior Publication Data
US 2014/0083556 A1    Mar. 27, 2014

Related U.S. Application Data

(63) Continuation-in-part of application No. 13/763,288, filed on Feb. 8, 2013.

(60) Provisional application No. 61/859,286, filed on Jul. 28, 2013, provisional application No. 61/597,380, filed on Feb. 10, 2012.

(51) Int. Cl.
*A01D 43/073*    (2006.01)
*A01D 43/08*    (2006.01)

(52) U.S. Cl.
CPC ............ *A01D 43/073* (2013.01); *A01D 43/087* (2013.01)

(58) Field of Classification Search
CPC .............. A01D 43/073; A01D 43/087; A01D 41/1278; A01D 41/1275; G05D 2201/0201

USPC ...... 56/10.2 R, 10.2 F; 701/50; 141/1, 95, 98, 141/83, 231, 198
See application file for complete search history.

(56) References Cited

U.S. PATENT DOCUMENTS

| | | | |
|---|---|---|---|
| 5,524,424 A | 6/1996 | Halgrimson et al. | |
| 5,575,316 A | 11/1996 | Pollklas | |

(Continued)

FOREIGN PATENT DOCUMENTS

| | | |
|---|---|---|
| DE | 4339441 | 5/1995 |
| DE | 4403893 | 8/1995 |

(Continued)

OTHER PUBLICATIONS

James Robert Borthwick, "Mining Haul Truck Pose Estimation and Load Profiling Using Stereo Vision," Aug. 2009, The University of British Columbia (94 pages).

(Continued)

*Primary Examiner* — Mark A Laurenzi
*Assistant Examiner* — Timothy P Kelly
(74) *Attorney, Agent, or Firm* — Hanley, Flight & Zimmerman, LLC

(57) ABSTRACT

A system and method for transferring agricultural material from a transferring vehicle to a storage portion of a receiving vehicle, and detecting and filling void areas of the agricultural material is disclosed. A transferring vehicle having a spout transfers agricultural material to a storage portion of a receiving vehicle. An imaging device associated with the transferring vehicle and facing towards the storage portion of the receiving vehicle collects imaging data. An image processing module is operable to, based on the imaging data, estimate fill levels of agricultural material within the storage portion; identify an area of the storage portion as targeted to fill; and identify a first void within the targeted area. A controller in communication with the image processing module is configured to command the spout to a position to direct agricultural material to the first void.

27 Claims, 16 Drawing Sheets

(56) References Cited

U.S. PATENT DOCUMENTS

| | | | |
|---|---|---|---|
| 5,621,645 | A | 4/1997 | Brady |
| 5,646,844 | A | 7/1997 | Gudat et al. |
| 5,712,782 | A | 1/1998 | Weigelt et al. |
| 5,749,783 | A | 5/1998 | Pollklas |
| 5,751,576 | A | 5/1998 | Monson |
| 6,216,071 | B1 | 4/2001 | Motz |
| 6,591,145 | B1 | 7/2003 | Hoskinson et al. |
| 6,682,416 | B2 | 1/2004 | Behnke et al. |
| 6,687,616 | B1 | 2/2004 | Peterson et al. |
| 6,732,024 | B2 | 5/2004 | Wilhelm Rekow et al. |
| 6,943,824 | B2 | 9/2005 | Alexia et al. |
| 7,277,784 | B2 | 10/2007 | Weiss |
| 7,537,519 | B2 * | 5/2009 | Huster .............. A01D 43/087 141/231 |
| 7,648,413 | B2 | 1/2010 | Duquesne et al. |
| 8,060,283 | B2 | 11/2011 | Mott et al. |
| 8,380,401 | B2 | 2/2013 | Pighi et al. |
| 8,428,829 | B2 | 4/2013 | Brunnert et al. |
| 8,656,693 | B2 * | 2/2014 | Madsen .............. A01D 43/087 141/1 |
| 2003/0086614 | A1 | 5/2003 | Shen et al. |
| 2003/0217539 | A1 | 11/2003 | Grossjohann et al. |
| 2005/0191050 | A1 | 9/2005 | Chapman |
| 2007/0003107 | A1 | 1/2007 | Wei et al. |
| 2009/0044505 | A1 | 2/2009 | Huster et al. |
| 2009/0099775 | A1 * | 4/2009 | Mott .............. A01B 69/008 701/300 |
| 2009/0222160 | A1 | 9/2009 | Morselli et al. |
| 2010/0063692 | A1 | 3/2010 | Madsen et al. |
| 2010/0108188 | A1 | 5/2010 | Correns et al. |
| 2010/0274452 | A1 | 10/2010 | Ringwald et al. |
| 2010/0332051 | A1 | 12/2010 | Kormann |
| 2011/0022273 | A1 | 1/2011 | Peters et al. |
| 2011/0061762 | A1 | 3/2011 | Madsen et al. |
| 2011/0066337 | A1 * | 3/2011 | Kormann .............. A01D 43/073 701/50 |
| 2011/0205084 | A1 | 8/2011 | Morselli et al. |
| 2011/0307149 | A1 * | 12/2011 | Pighi .............. A01D 41/127 701/50 |
| 2012/0263560 | A1 | 10/2012 | Diekhans et al. |
| 2012/0302299 | A1 | 11/2012 | Behnke et al. |
| 2013/0045067 | A1 | 2/2013 | Pickett et al. |
| 2013/0213518 | A1 | 8/2013 | Bonefas |

FOREIGN PATENT DOCUMENTS

| | | |
|---|---|---|
| DE | 102007009666 | 8/2008 |
| DE | 102011005400 | 9/2012 |
| DE | 102014108449 | 2/2015 |
| EP | 2138027 | 12/2009 |
| EP | 2361494 | 8/2011 |
| EP | 2301318 | 11/2011 |
| EP | 2311307 | 12/2011 |
| EP | 2020174 | 2/2012 |
| GB | 2517049 | 2/2015 |
| JP | 2177815 | 7/1990 |
| WO | 2011101458 | 8/2011 |

OTHER PUBLICATIONS

Sanjiv et al., "Autonomous Cross-Country Navigation Using Stereo Vision," Jan. 1999, Carnegie Mellon University (76 pages).

Patent Cooperation Treaty, "International Search Report," issued by the International Searching Authority in connection with PCT application No. PCT/US2013/025547, mailed Apr. 15, 2013 (2 pages).

Patent Cooperation Treaty, "Written Opinion of the International Searching Authority," issued by the International Searching Authority in connection with PCT application No. PCT/US2013/025547, mailed Apr. 15, 2013 (15 pages).

Patent Cooperation Treaty, "International Search Report," issued by the International Searching Authority in connection with PCT application No. PCT/US2013/025548, mailed Apr. 17, 2013 (2 pages).

Patent Cooperation Treaty, "Written Opinion of the International Searching Authority," issued by the International Searching Authority in connection with PCT application No. PCT/US2013/025548, mailed Apr. 17, 2013 (7 pages).

CLAAS—Press Releases, "Agritechnica 2009: Two Golds and a Silver for CLAAS," 2009, [retrieved on Oct. 3, 2012, from the Internet: <URL: http://www.claas.com/cl-gr/en/press/mitteilungen/2009/start,%20cid=565120,bpSite=351 08,lang=en_UK.html>] (2 pages).

AgCam Photo Album [online], Dakota Micro, Inc. [retrieved on Oct. 3, 2012, from the Internet <URL: http://dakotamicro.com/docs/AgCam Photo Album.pdf>] (31 pages).

United Kingdom Intellectual Property Office, "Search Report under Section 17(5)", issued in connection with Application No. GB1410199.2, issued on Dec. 5, 2014, 10 pages.

United States Patent and Trademark Office, "Restriction Requirement," issued in connection with U.S. Appl. No. 13/763,288, mailed on Jul. 16, 2015, 6 pages.

Patent Cooperation Treaty, "International Preliminary Report on Patentability," issued in connection with PCT Patent Application No. PCT/US2013/025547, issued on Aug. 12, 2014, 16 pages.

Patent Cooperation Treaty, "International Preliminary Report on Patentability," issued in connection with PCT Patent Application No. PCT/US2013/025548, issued on Aug. 12, 2014, 8 pages.

United States Patent and Trademark Office, Non-Final Office Action, issued in connection with U.S. Appl. No. 13/763,288, mailed on Oct. 27, 2015, 31 pages.

German Patent Office, English version of Office Action, issued in connection with German Patent Application No. 10 2014 108 449.7, issued on Nov. 24, 2015, 11 pages.

European Patent Office, Extended European Search Report, issued in connection with European Patent Application No. 13746245.3, issued on Aug. 25, 2015, 7 pages.

United States Patent and Trademark Office, Final Office Action, issued in connection with U.S. Appl. No. 13/763,288, mailed on May 12, 2016, 35 pages.

* cited by examiner

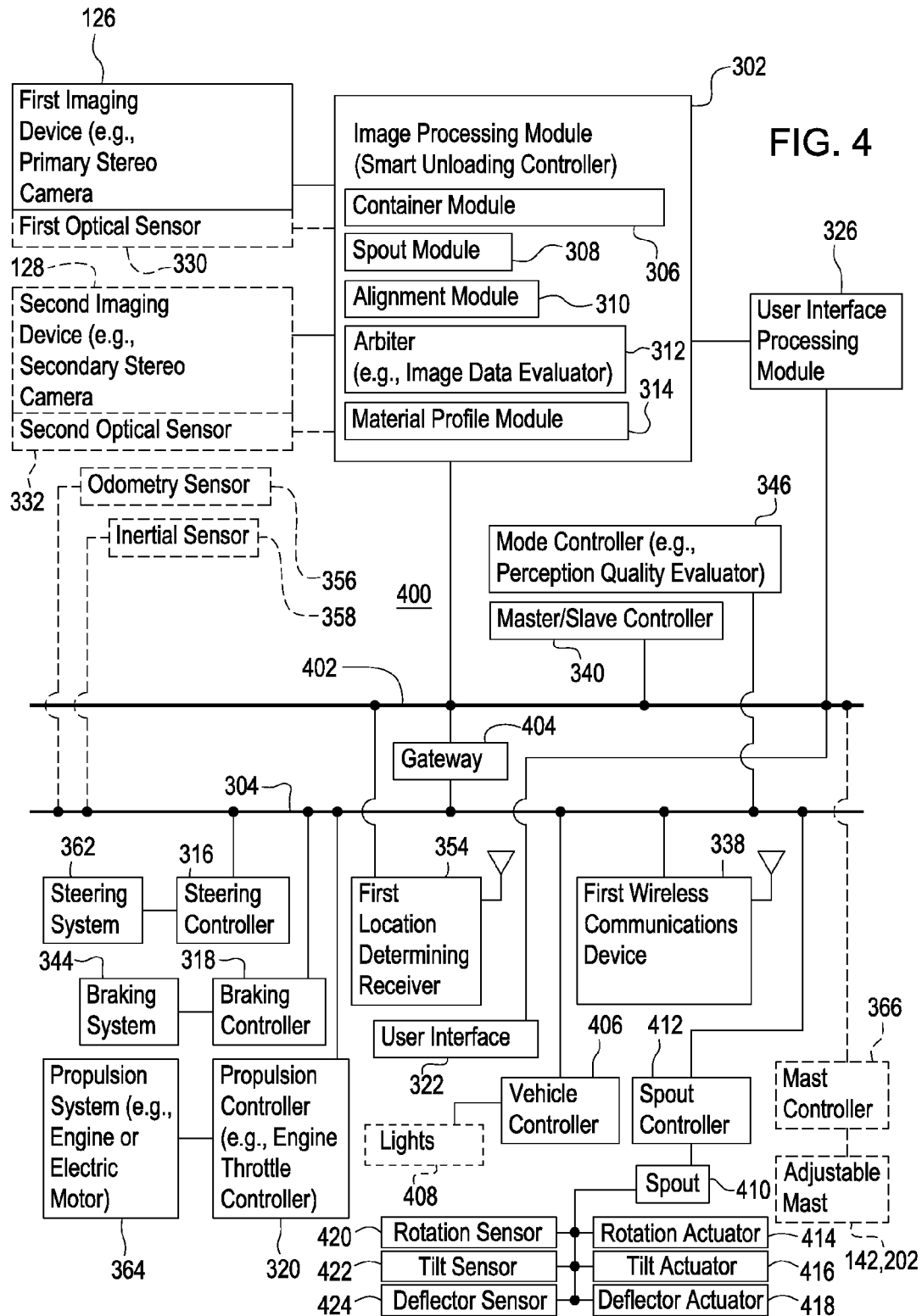

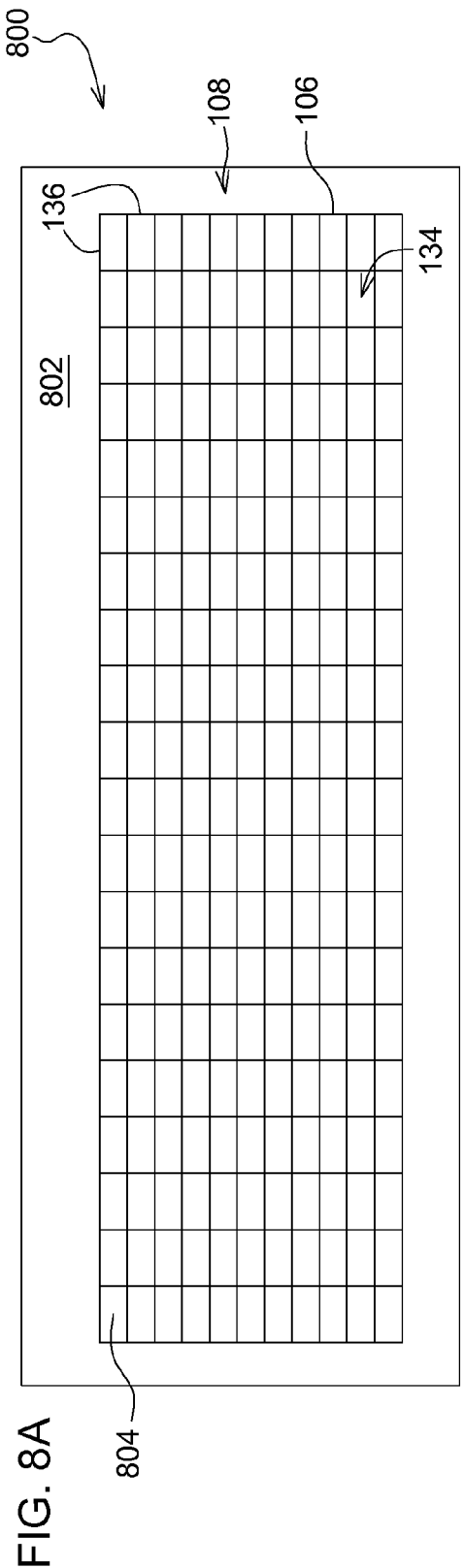
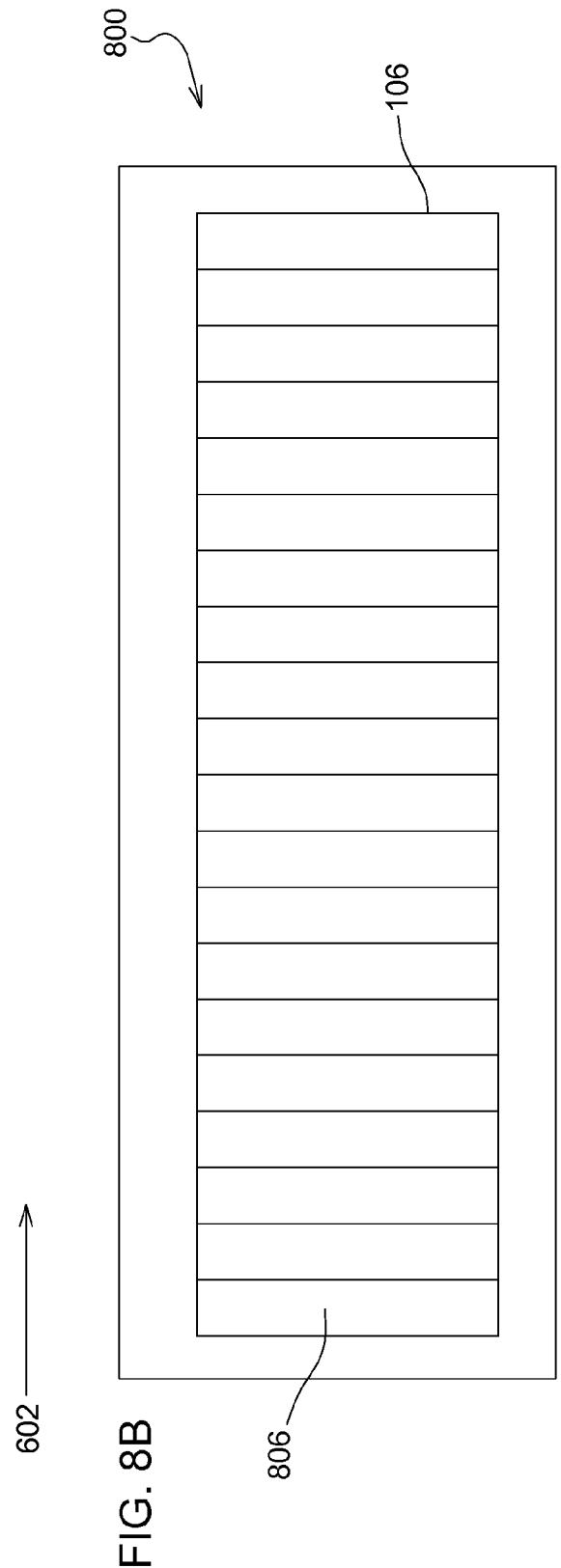

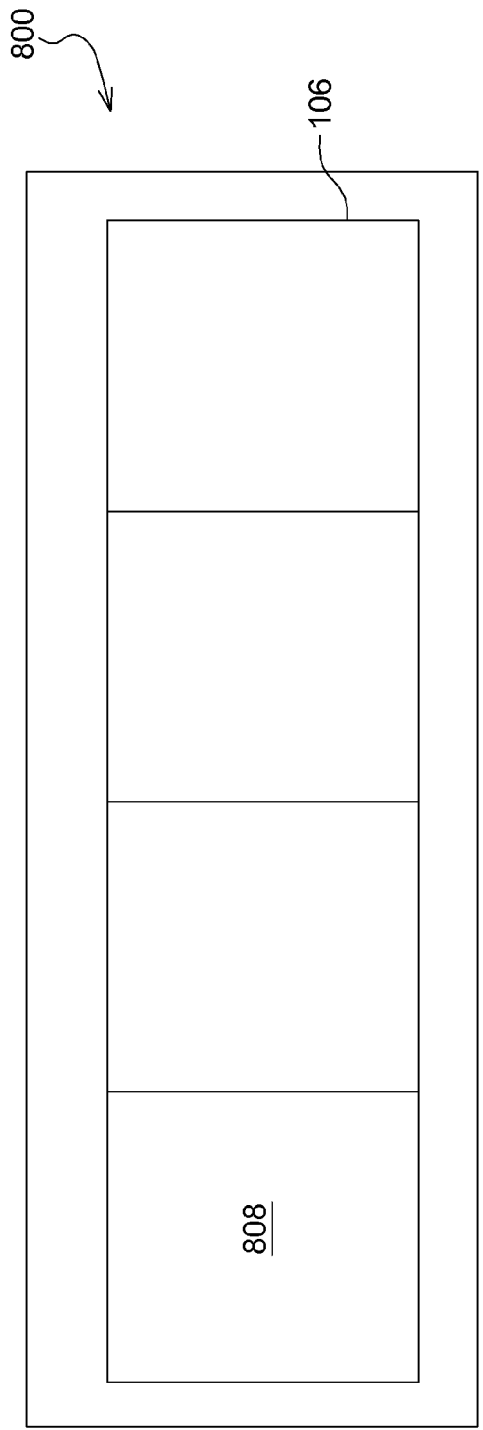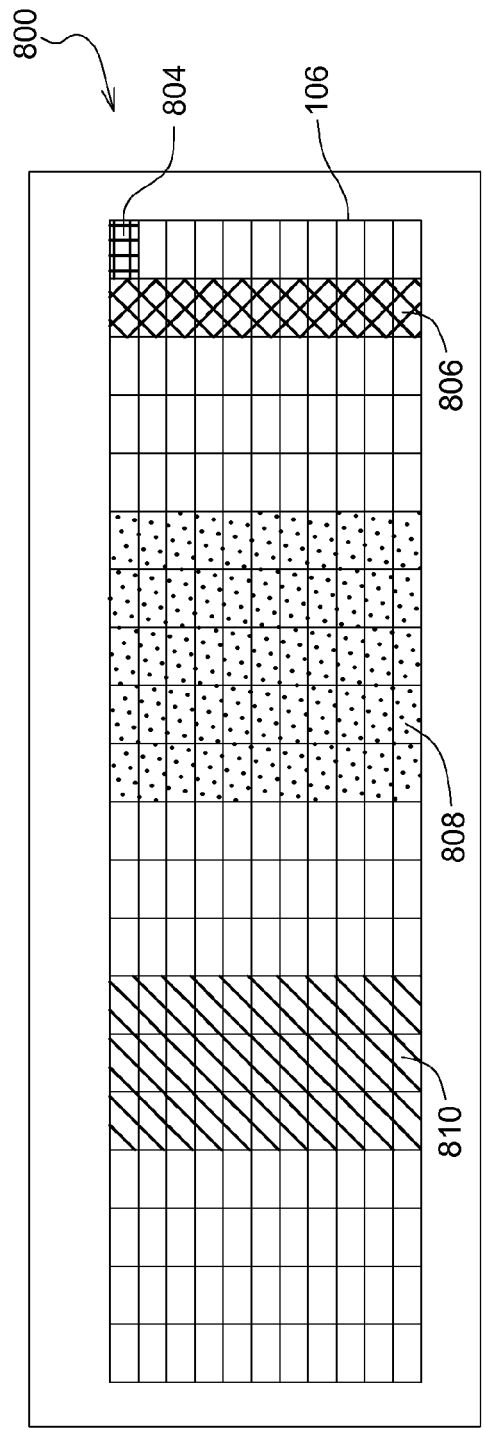

US 9,392,746 B2

ARTIFICIAL INTELLIGENCE FOR DETECTING AND FILLING VOID AREAS OF AGRICULTURAL COMMODITY CONTAINERS

RELATED APPLICATIONS

This patent claims the benefit of U.S. Provisional Patent Application Ser. No. 61/859,286, filed Jul. 28, 2013. This patent is also a continuation-in-part of U.S. patent application Ser. No. 13/763,288, filed on Feb. 8, 2013, which claims the benefit of U.S. Provisional Patent Application Ser. No. 61/597,380, filed Feb. 10, 2012. U.S. Provisional Patent Application Ser. No. 61/859,286, U.S. patent application Ser. No. 13/763,288, and U.S. Provisional Patent Application Ser. No. 61/597,380 are incorporated herein by reference in their entirety.

JOINT RESEARCH AGREEMENT

This application resulted from work performed under or related to a joint research agreement between Iowa State University and Deere & Company, entitled "Iowa State University Master Research Agreement," dated Jan. 1, 2006, as amended in an Amendment dated Jan. 1, 2011, and as such is entitled to the benefits available under 35 U.S.C. §103(c).

FIELD OF THE INVENTION

The present disclosure pertains to agricultural material transfer and, more particularly, to detecting and filling voids during the transfer of agricultural material.

BACKGROUND OF THE INVENTION

A harvesting machine, such as a combine or self-propelled forage harvester, is typically used to harvest large quantities of agricultural material, such as grain or silage, in a field. Typically, harvesting machines utilize a spout (e.g., an unloading auger) to transfer agricultural material to a storage portion (e.g., a grain cart or wagon), of a receiving vehicle (e.g., a tractor). The material transfer/unloading process may occur when the harvesting machine and the receiving vehicle are stationary. Alternatively, the material transfer/unloading process may occur on-the-go, while the harvesting machine and the receiving vehicle are moving and the harvesting machine is simultaneously harvesting agricultural material.

When unloading on-the-go, the operators of the harvesting machine and the receiving vehicle must work together to maintain cooperative alignment therebetween to prevent spillage of agricultural material outside of the storage portion and to achieve a desired distribution of material within the storage portion. Desired distributions of material may optimize the material fill level by avoiding unused space within the storage portion. By achieving a desired distribution and avoiding spillage, the operational efficiency of the transportation of agricultural material from a field to a grain bin may be optimized. Controlling the spout position while maintaining cooperative alignment is a challenging process because an operator of the harvesting machine must monitor various controls relating to harvesting the crop in front of the harvesting machine, while simultaneously monitoring and controlling the material transfer process to the side of the harvesting machine. Further difficulties arise because the operator may not have a clear line of sight into the storage portion.

SUMMARY

An example system for facilitating transfer of agricultural material is disclosed. A transferring vehicle has a propelled portion for propelling the transferring vehicle and a spout for transferring the agricultural material to a storage portion of the receiving vehicle. The spout has a discharge portion. A first imaging device associated with the transferring vehicle and faces towards the storage portion of the receiving vehicle and collects first image data. An image processing module is operable to estimate an observed fill level of the storage portion based on the first image data and to estimate a distribution of agricultural material in the storage portion. The image processing module is arranged to identify at least one void in the estimated distribution and an associated target position in an opening directly above the at least one void. A controller, responsive to the observed fill level meeting or exceeding a target partial fill level of agricultural material in the storage portion, triggers shifting of the discharge portion of the spout to the target position to fill the void in the agricultural material.

An example method of transferring agricultural material includes collecting image data by an imaging device facing towards a storage portion of a receiving vehicle. The storage portion of the receiving vehicle is capable of storing agricultural material transferred to the storage portion from a transferring vehicle via a spout. While the agricultural material is being transferred to the storage portion, the image data is processed to determine a fill level profile of the agricultural material within the storage portion. Based on the fill level profile, a first void is identified within the storage portion and the spout is commanded to a first position to direct agricultural material to the first void.

An example system includes a transferring vehicle having a spout for transferring agricultural material to a storage portion of a receiving vehicle. An imaging device associated with the transferring vehicle faces towards the storage portion of the receiving vehicle and collects imaging data. An image processing module is operable to, based on the imaging data, estimate fill levels of agricultural material within the storage portion; identify an area of the storage portion as targeted to fill; and identify a first void within the targeted area. A controller is in communication with the image processing module and is configured to command the spout to a position to direct agricultural material to the first void.

BRIEF DESCRIPTION OF THE DRAWINGS

FIG. 4 is a block diagram of another example machine vision-augmented guidance for a transferring vehicle for facilitating the unloading or transferring of agricultural material from the transferring vehicle (e.g., a self-propelled forage harvester).

FIG. 8A is an example fill model of a storage portion of the receiving vehicle illustrating cells.

FIG. 8B is the example fill model of FIG. 8A illustrating columns.

FIG. 8C is the example fill model of FIG. 8A illustrating zones.

FIG. 8D is the example fill model of FIG. 8A illustrating a void area.

DETAILED DESCRIPTION

Figure 1A:
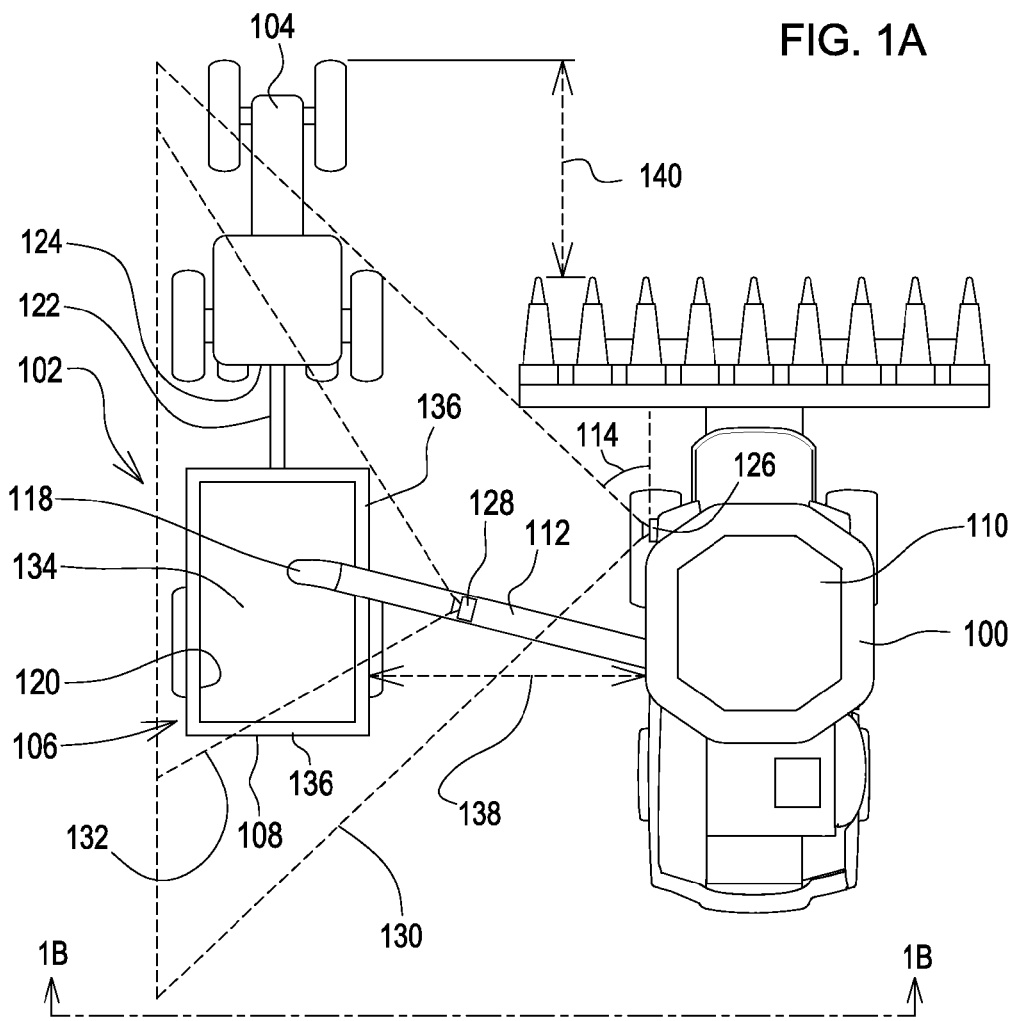
FIG. 1A is a plan view showing example imaging devices mounted on a transferring vehicle and facing toward a receiving vehicle.

Systems and methods for controlling the transfer of agricultural material from a transferring vehicle 100 to a receiving vehicle 102 are disclosed herein. As depicted in FIGS. 1A-2B, the transferring vehicle 100 is shown as a combine, whereas the receiving vehicle 102 is shown as a tractor and a grain cart. More generally, the receiving vehicle 102 may include the combination of a propelled portion 104 and a storage portion 106 of a container 108 (i.e., a towed storage unit). However, other examples may utilize other types of working machines. For example, the transferring vehicle 100 may be a self-propelled forage harvester. Moreover, the systems and methods disclosed herein are applicable to the transfer of any type of agricultural material, including but not limited to corn, maize, soybeans, silage, wheat, oats, rye, barley, flax, oilseed, fiber, vegetables, fruit, nuts, seeds, or other agricultural material.

In certain examples, harvested agricultural material is transferred to a grain tank 110 (e.g., a hopper), where it may be stored until a material transfer (i.e., unloading) process is initiated. During a material transfer process, the agricultural material is transferred from the grain tank 110 to the storage portion 106 of the receiving vehicle 102 via a spout 112 (e.g., an unloading auger). Other examples, such as examples utilizing self-propelled forage harvesters, do not utilize the grain tank 110. In such examples, the agricultural material is transferred directly to the storage portion 106 as it is harvested.

Figure 1B:
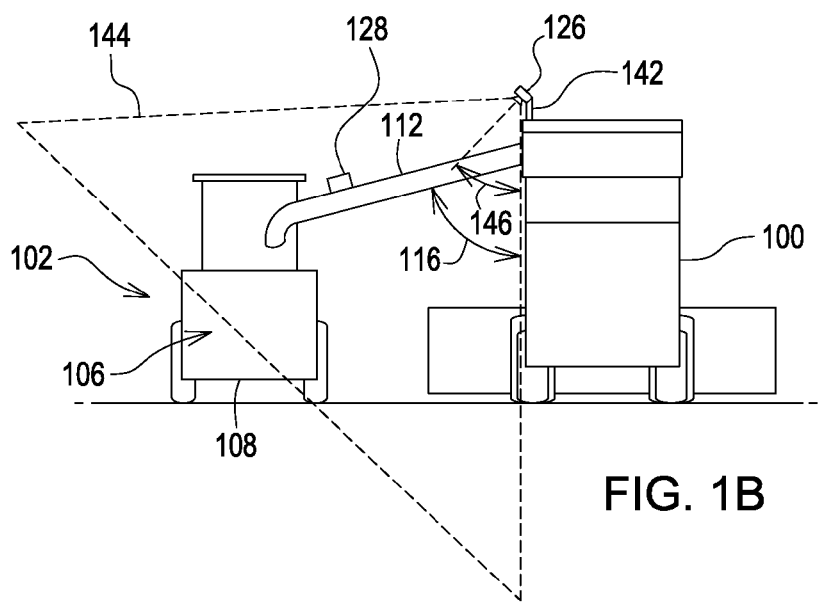
FIG. 1B is a view in a horizontal plane as viewed along reference line 1B-1B in FIG. 1A.
Figure 2A:
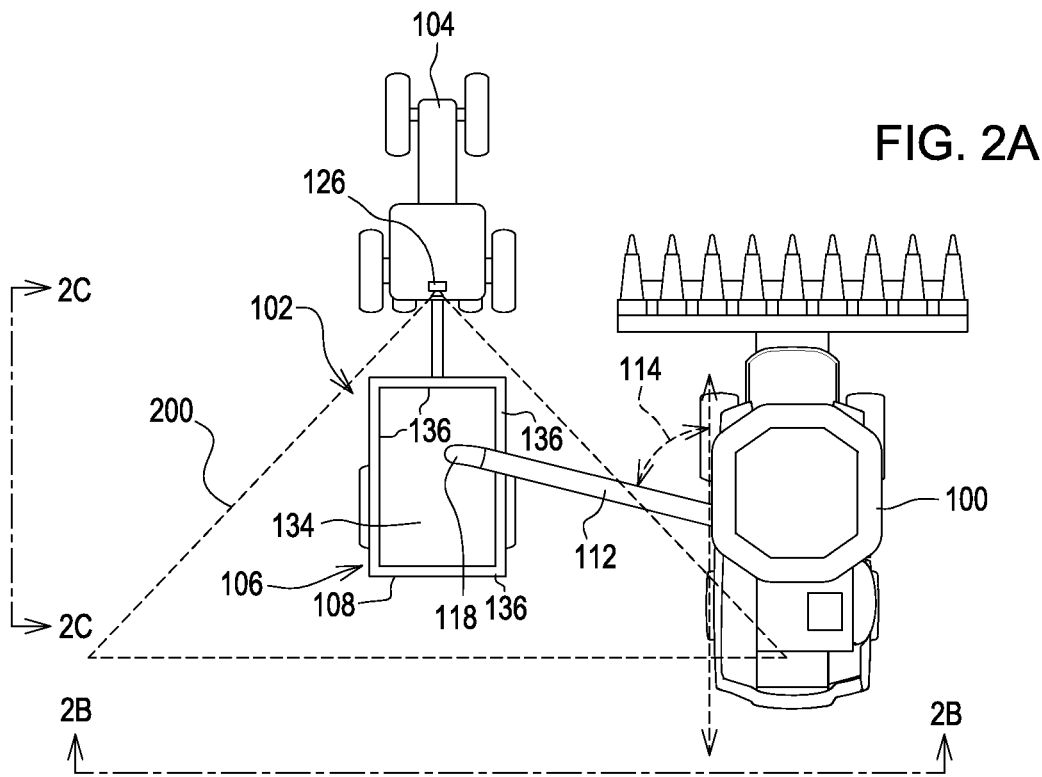
FIG. 2A is a plan view showing an example imaging device (e.g., a stereo vision system) mounted on a receiving vehicle and facing a storage portion of the receiving vehicle.
Figure 2B:
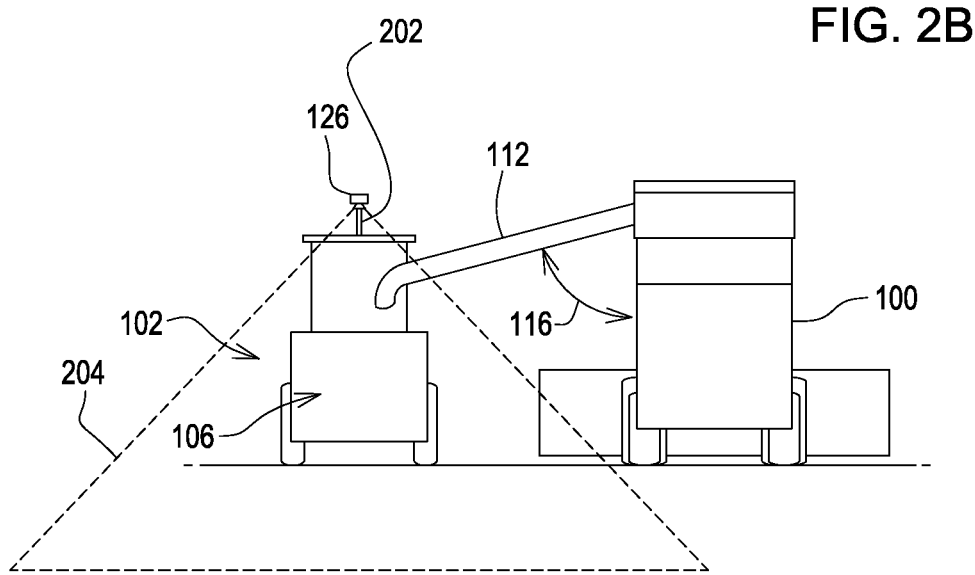
FIG. 2B is a view in a horizontal plane as viewed along reference line 2B-2B in FIG. 2A.

To achieve a desired distribution of agricultural material within the storage portion 106, an auger rotation system is configured to sense a spout rotation angle 114 of FIGS. 1A and 2A and/or 116 of FIGS. 1B and 2B and rotate the spout 112 to change the relative position of a spout end 118 of the spout 112 with respect to a container perimeter 120 of the storage portion 106 of the container 108. Additionally or alternatively, an alignment module may be adapted for generating command data to the transferring vehicle 100 and/or the propelled portion 104 of the receiving vehicle 102 to steer the storage portion 106 and/or the propelled portion 104 to change the relative position of the spout 112 with respect to the container perimeter 120.

Various control methodologies may be used to control the position of the spout 112 during a material transfer process to achieve a desired material distribution. In some examples, voids within the distribution of agricultural material are identified and the position of the spout 112 is adjusted to fill the voids. This and other examples will be described in detail below.

There are many benefits to achieving a desired distribution of agricultural material within the storage portion 106. For example, desired distributions may optimize the material handling capabilities by avoiding spillage from and unused space within the storage portion 106 in order to maximize the operational efficiency of the transportation of agricultural material between two locations, e.g., from a field to a grain bin. Furthermore, desired distributions may prevent uneven loading and localized stresses on portions of the receiving vehicle 102 imparted by the weight of the agricultural material within the storage portion 106. For example, an uneven distribution may cause localized stresses on a tongue 122 and/or a hitch 124 that couples the container 108 to the propelled portion 104 of the receiving vehicle 102. Furthermore, an uneven distribution may increase localized soil compaction imparted by certain wheels of the container 108, which may negatively affect the emergence of next year's crop. Thus, achieving a desired distribution of agricultural material within the storage portion 106 results in significant benefits.

Example systems and methods described herein may utilize imaging devices such as a first imaging device 126 and may optionally utilize a second imaging device 128 and/or other sensors to monitor the fill level and distribution of agricultural material within the storage portion 106. For the sake of clarity and brevity, the first and second imaging devices 126, 128 are referred to herein as such. However, references of the first and second imaging devices 126, 128 are intended to include example systems including one of the first imaging device 126 or the second imaging device 128. In some examples, the second imaging device 128 is optional and provides redundancy to the first imaging device 126 in case of failure, malfunction or unavailability of image data from the first imaging device 126. Similarly, the first imaging device 126 may provide redundancy to the second imaging device 128.

The first and second imaging devices 126, 128 may be stereo imaging devices that may provide digital data output as stereo video image data or as a series of stereo still frame images at regular or periodic intervals, or at other sampling intervals. Each stereo image (e.g., the first image data or the second image data) has two component images of the same scene or a portion of the same scene. In an alternate example the first and second imaging devices 126, 128 may be monocular imaging devices and may output first and second monocular image data, respectively. In an example, the first and second imaging devices 126, 128 may include a charge-coupled device (CCD), a complementary metal-oxide semiconductor (CMOS) array, or another suitable device for detection or collection of image data.

As shown in FIGS. 1A and 1B, the first and second imaging devices 126, 128 may be mounted on the transferring vehicle 100. However, in alternate examples as shown in FIGS. 2A and 2B, the first imaging device 126 and/or the optional second imaging device 128 may be mounted on the receiving vehicle 102 or the propelled portion 104 of the receiving vehicle 102.

The first imaging device 126 has a first field of view 130 and the second imaging device 128 has a second field of view 132, each of which are indicated by dashed lines in FIG. 1A. The boundaries of the fields of view 130, 132 are merely shown for illustrative purposes and will vary in actual practice. The spout end 118 (e.g., a boot) of the spout 112 is generally aligned over a central zone 134 within the container perimeter 120 defined by edges 136 of the storage portion 106 for unloading material from the transferring vehicle 100 to the receiving vehicle 102. Similarly, the transferring vehicle 100 and the receiving vehicle 102 may be aligned in the position as shown in FIGS. 1A-2B, regardless of whether the vehicles move together in a forward motion (e.g., with coordinated or tracked vehicle headings) during harvesting, as is typical, or are stationary. Alignment between the transferring vehicle 100 and the receiving vehicle 102 may be defined by a lateral offset 138 and a fore/aft offset 140.

In FIG. 1B, the first and second imaging devices 126, 128 are mounted on the transferring vehicle 100, where the first imaging device 126 is mounted on a first support 202 (e.g., a monopole platform with tilt and/or pan adjustments) to provide a first downward field of view 144. As shown in FIG. 1B, a down-tilt angle 146 is measured with respect to a vertical axis. A tilt sensor on or in the first imaging device 126, or associated with the mast-imaging device mounting hardware, may measure the down-tilt angle 146 (e.g., declination angle). For example, the tilt sensor may comprise one or more accelerometers, such as those that are commercially available for portable consumer electronic devices.

If the first imaging device 126 is elevated or mounted on the transferring vehicle 100 sufficiently high with respect to the storage portion 106, the first imaging device 126 will have the visibility or downward field of view 144 into the storage portion 106 of the container 108 sufficient to observe and profile the surface (i.e., height (z) versus respective x, y coordinates in the container) of the agricultural material (e.g., grain) as the agricultural material fills the storage portion 106 of the container 108. The first imaging device 126 may be mounted on the roof of the transferring vehicle 100 facing or looking directly away from the side of the transferring vehicle 100 with the spout 112 for unloading agricultural material.

If the first imaging device 126 is further from the storage portion 106 or the container 108 than the second imaging device 128 during unloading of the agricultural material, the first imaging device 126 may have suitable view of the storage portion 106 to facilitate easier tracking of the relative position of the storage portion 106 to the transferring vehicle 100.

In one illustrative configuration, consistent with the downward field of view 144 in FIG. 1B, the optical axes of the first and second imaging devices 126, 128 are perpendicular to a respective lens thereof and are tilted downward from a generally horizontal plane at the down-tilted angle 146 (e.g., approximately 60 to 85 degrees downward from the vertical axis or approximately 10 to 25 degrees downward from a horizontal axis or horizontal plane as shown in FIG. 1B). There are several advantages to having a field of view or optical axis of the first or second imaging device 126, 128 tilted downward from a generally horizontal plane.

First, less of the sky is visible in the field of view of the first imaging device 126 such the collected image data tends to have a more uniform image intensity profile. The tilted configuration of the optical axis (which are perpendicular to the lenses of the imaging devices 126 is well suited for mitigating the potential dynamic range issues caused by bright sunlight or intermediate cloud cover, for instance. In one example, the first or second imaging device 126, 128 is mounted with a down-tilt angle 146 to avoid washout of, corruption of, or interference with collected image data during a transient exposure time period to sunlight, a reflection, or a light source that exceeds a threshold brightness level for a material portion of the pixels in the collected image data. Second, the bottom part of the storage portion 106 becomes more visible in the image data to enable the recording of the image data related to one or more wheels of the storage portion 106. The wheel is a feature on the storage portion 106 that may be robustly tracked by image processing techniques. Third, tilting the stereo camera down may mitigate the accumulation of dust and other debris on the lens or external window of the first or second imaging device 126, 128.

FIG. 2A shows the first imaging device 126 on the rear of the propelled portion 104 (e.g., a tractor) of the receiving vehicle 102. The first imaging device 126 has a first field of view 200 indicated by the dashed lines. The spout end 118 of the spout 112 is generally aligned over the central zone 134 (e.g., central region or target area) of the storage portion 106 of the container 108 for unloading material from the transferring vehicle 100 to the receiving vehicle 102. Similarly, the transferring vehicle 100 and the receiving vehicle 102 are aligned in position as shown, even as the vehicles 102, 100 move with coordinated headings or generally parallel headings with no or minimal relative velocity with respect to each other.

In an alternative example of FIG. 2A, the optional second imaging device 128 may be mounted on the receiving vehicle 102 with a second field of view, which may be slightly offset from, overlapped with, or aligned with the first field of view 200 to provide redundancy should the first imaging device 126 fail, malfunction, be unavailable, be unreliable, or provide poor quality image data. For example, the first imaging device 126 may not operate reliably if it is obscured by dust, fog, salt, or air-born contaminants, or if it is exposed to inadequate ambient light conditions or excessive glare from sunlight or reflected light. In FIG. 2A, an image processing module may estimate the distance or range from the first imaging device 126, the second imaging device 128, or both to an object in the image, such as the spout 112, the spout end 118, the container perimeter 120, or the level or profile of agricultural material in storage portion 106 of the container 108 (e.g., at various positions or coordinates within the storage portion 106).

FIG. 2B illustrates a view in a horizontal plane as viewed along reference line 2B-2B in FIG. 2A. In one example, the first imaging device 126 is mounted on the receiving vehicle 102 on a first support 142 (e.g., monopole with tilt or pan adjustment) to provide a first downward field of view 204 or a first down-tilted field of view.

If the first imaging device 126 is elevated or mounted on the receiving vehicle 102 sufficiently high with respect to the storage portion 106, the first imaging device 126 will have visibility or the first downward field of view 204 into the storage portion 106 sufficient to observe and profile the surface (i.e., height z versus respective x, y coordinates in the container) of the agricultural material (e.g., grain) as the agricultural material fills the storage portion 106 of the container 108. The first imaging device 126 may be mounted on the roof or cab of the propelled portion 104 of the receiving vehicle 102 facing or looking directly away from the side of the transferring vehicle 100 with the spout 112 for unloading agricultural material.

Figure 3:
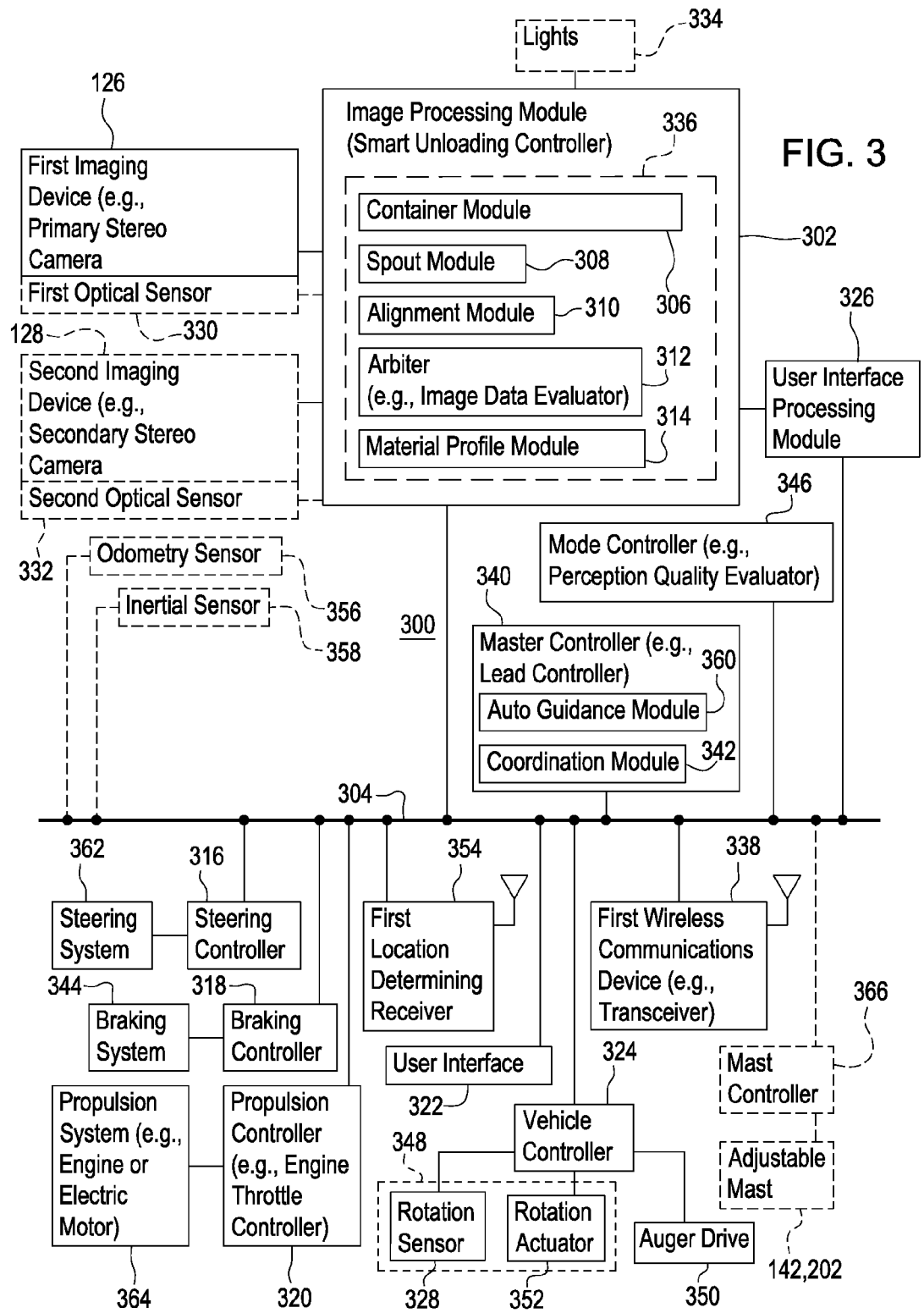
FIG. 3 is a block diagram of an example machine vision-augmented guidance system for a transferring vehicle for facilitating the unloading or transferring of agricultural material from the transferring vehicle (e.g., a combine or a self-propelled forage harvester).

The block diagram of FIG. 3 illustrates an example system 300 for facilitating the transfer of agricultural material in connection with the equipment of FIGS. 1A-2B. The first and second imaging devices 126, 128 transmit collected image data to an image processing module 302. The image processing module 302 may be coupled to a vehicle data bus 304 and may include a container module 306, a spout module 308, and alignment module 310, an arbiter 312, and a material profile module 314. The image processing module 302 analyzes the collected image data and generates command data to various components of the system 300 to facilitate material transfer. For example, a steering controller 316, a braking controller 318, a propulsion controller 320, a user interface 322, a vehicle controller 324, and a user interface processing module 326, among other optional components, may be coupled to the vehicle data bus 304 to receive command data to facilitate material transfer.

The first and second image devices 126, 128 are coupled to the image processing module 302 and transmit collected image data thereto. The collected image data may include stereo image data or monocular image data. If the collected image data is monocular image data, the image processing module 302 may create a stereo image from the first and second monocular image data (e.g., right and left image data, respectively) with reference to the relative position and orientation of the first and second imaging devices 126, respectively. The image processing module 302 determines: (1) at least two points on a common visual axis that bisects the lenses of both the first and second imaging devices 126, 128, and (2) a linear spatial separation between the first and second imaging devices 126, 128, where the first field of view 130 (in FIG. 1A) of the first imaging device 126 and the second field of view 132 of the second imaging device 128 overlap, at least partially, to capture the spout 112, the spout end 118 and the container perimeter 120 in the collected image data.

The image processing module 302 may utilize the rotation angle 114 of the spout 112 to facilitate fusion of image data from the first imaging device 126 and the second imaging device 128, or to construct stereo image data where the first imaging device 126 and the second imaging device 128 individually provide monocular image data for the same scene or object. In any arrangement of imaging devices 126, 128 disclosed herein where the fields of view 130, 132 overlap, data fusion of image data from a first imaging device 126 and a second imaging device 128 enables the image processing module 302 to create a virtual profile of the material distribution level inside the storage portion 106 of the container 108, even when the entire surface of the agricultural material is not visible to one of the first or second imaging devices 126, 128. Even if the second imaging device 128 is not mounted on the spout 112 in certain configurations, a rotation sensor 328 may utilize the spout end 118 as a reference point in any collected image data to facilitate, e.g., fusion, virtual stitching, or alignment of image data from different imaging devices. The virtual profile of the entire surface of the agricultural material in the storage portion 106 enables the system 300 to intelligently execute a material transfer strategy.

First and second optical sensors 330, 332 may be associated with the first and second imaging devices 126, 128 respectively, and may be coupled to the image processing module 302. The first and second optical sensors 330, 332 may include, e.g., a light meter, a photo-sensor, a photo-resistor, a photo-sensitive device, or a cadmium-sulfide cell, among other sensors. The image processing module 302 may be coupled, directly or indirectly, to optional lights 334 on the transferring vehicle 100 (FIGS. 1A-2B) for illumination of the storage portion 106 and/or the spout 112. For example, the image processing module 302 may control drivers, relays or switches, which in turn control the activation or deactivation of the optional lights 334. The lights 334 may be activated, for example, if an ambient light measurement from the first and second optical sensors 330, 332 is below a predetermined minimum threshold.

The container module 306 may identify a set of two-dimensional or three dimensional points (e.g., in Cartesian coordinates or Polar coordinates) corresponding to pixel positions in images collected by the first and second imaging devices 126, 128. The set of two-dimensional or three dimensional points may define the position of the receiving vehicle 102. For example, the set of points may define a portion of the container perimeter 120 (FIGS. 1A and 2A) of the storage portion 106.

The container module 306 may use or retrieve container reference data to further define objects within the collected images. The container reference data may comprise one or more of the following: reference dimensions (e.g., length, width, height), volume, reference shape, drawings, models, layout, and configuration of the storage portion 106, the container perimeter 120, and the container edges 136; reference dimensions, reference shape, drawings, models, layout, and configuration of the entire container 108 of the receiving vehicle 102; wheelbase, turning radius, and hitch configuration of the propelled portion 104 and/or the container 108; and distance between a pivot point of the hitch 124 and the wheelbase of the container 108. The container reference data may be stored and retrieved from a data storage device 336 (e.g., non-volatile electronic memory). For example, the container reference data may be stored by, retrievable by, or indexed by a corresponding vehicle identifier of the receiving vehicle 102 in the data storage device 336 of the system 300 of the transferring vehicle 100. For each vehicle identifier of the receiving vehicle 102, there may be a corresponding unique container reference data stored in the data storage device 336.

In one example, the transferring vehicle 100 receives a data message from the receiving vehicle 102 in which a vehicle identifier of the receiving vehicle 102 is regularly (e.g., periodically) transmitted. In another example, the transferring vehicle 100 interrogates the receiving vehicle 102 for its vehicle identifier or establishes a communication channel between the transferring vehicle 100 and the receiving vehicle 102 in preparation for unloading via a wireless communication device 338. In yet another example, the receiving vehicle 102 transmits its vehicle identifier to the transferring vehicle 100 when the receiving vehicle 102 approaches the transferring vehicle 100 within a certain radial distance. In still another example, only one known configuration of the receiving vehicle 102 is used with a corresponding transferring vehicle 100 and the container reference data is stored or saved in the data storage device 336. In the latter example, the transferring vehicle 100 is programmed, at least temporarily, solely for receiving vehicles 102 with identical containers 108, which may be identical in dimensions, capacity, proportion and shape.

In one configuration, the container module 306 identifies the position of the container 108 as follows. If the linear orientation of a set of pixels in the collected image data conforms to one or more edges 136 of the perimeter 120 of the container 108 as prescribed by the container reference data, the position of the container 108 is considered to be identified. For example, the central zone 134 of the container 108 may be identified by dividing (i.e., dividing by two) the distance (e.g., the shortest distance or the surface normal distance) between opposite sides of the container, or, alternatively, by identifying corners of the container and subsequently identifying where diagonal lines that intercept the corners intersect. In one configuration, the central zone 134 may be defined as an opening (e.g., circular, elliptical, or rectangular) in the container with an opening surface area that is greater than or equal to the cross-sectional surface area of the spout end 118 by a factor of at least two, although other surface areas fall within the scope of the claims.

The spout module 308 is configured to identify the spout of the transferring vehicle 100 in the collected image data. In one configuration, the spout module 308 identifies one or more of the following: (1) spout pixels on at least a portion of the spout 112, (2) spout end pixels that are associated with the spout end 118, (3) spout pixels associated with the spout 112. The spout module 308 may use color discrimination, intensity discrimination, or texture discrimination to identify background pixels from one or more selected spout pixels with associated spout pixel patterns or attributes (e.g., color or color patterns (e.g., Red Green Blue (RGB) pixel values), pixel intensity patterns, texture patterns, luminosity, brightness, hue, or reflectivity) used on the spout 112 or on the spout end 118 for identification purposes.

The alignment module 310 and/or a master/slave controller 340 estimate or determine motion commands at regular intervals to maintain alignment of the spout end 118 over the central zone 134 of the storage portion 106 for unloading agricultural material. The alignment module 310 and/or the master/slave controller 340 may send commands or requests to the transferring vehicle 100 with respect to its speed, velocity, or heading to maintain alignment of the position of the transferring vehicle 100 with respect to the receiving vehicle 102. For example, the alignment module 310 may transmit a request for a change in a spatial offset between the vehicles 102, 100 to the master/slave controller 340. In response, the master/slave controller 340 or a coordination module 342 transmits a steering command or heading command to the steering controller 316, a braking or deceleration command to a braking system 344, and a propulsion, acceleration or torque command to the propulsion controller 320 to achieve the target spatial offset or change in spatial offset. Further, similar command data may be transmitted via the wireless communication device 338 to the receiving vehicle 102 for observational purposes or for control of the receiving vehicle 102.

In another configuration, the alignment module 310 or the image processing module 302 may regularly or periodically move, adjust or rotate the spout end 118 to the central zone 134 during loading of the storage portion 106 of the receiving vehicle 102 to promote even filling, a uniform height, a uniform distribution, or a desired non-uniform distribution of the agricultural material in the storage portion 106. In such a configuration, the image processing module 302 identifies the fill state of the agricultural material in the image data from the material profile module 314.

The arbiter 312 evaluates image data quality. For example, the arbiter 312 may include an evaluator, a judging module, Boolean logic circuitry, an electronic module, a software module, or software instructions to determine: (1) whether or not to use the first image data (i.e., from the first imaging device 126) and/or the second image data (i.e., from the second imaging device 128); and/or (2) whether or not to use the image processing module 302 or its output data to align the spout end 118 with respect to the container perimeter 120 or to adjust the spatial offset between the vehicles 102, 100. In one example, the arbiter 312 determines whether or not to use the first image data, the second image data, and the output data of the image processing module 302 based on the evaluation of one or more of the following metrics, factors or criteria during one or more sampling periods: material variation of intensity of pixel data, material variation in ambient light conditions, image rectification quality, disparity image quality, stereo correspondence data quality, reliability, extent or degree of identification of edges of one or more image objects (e.g., the spout 112, the spout end 118, the container perimeter 120, the storage portion 106), and reliability of coordinate estimation (e.g., three dimensional coordinates) of one or more objects in the image. The arbiter 312 may communicate one or more quality indicators (e.g., a third indicator message) to an optional mode controller 346, for example, via a data bus, a logical data path, a physical data path, or a virtual data path.

The material profile module 314 is configured to detect a one-dimensional, two-dimensional, or three-dimensional representation of the fill level or a volumetric distribution of the agricultural material in the storage portion 106. Example fill level representations will be discussed in further detail in connection with FIG. 6.

The vehicle controller 324 may include an auger rotation system 348 and an auger drive 350. The auger rotation system 348 may include, for example, (1) the rotation sensor 328 for sensing the spout rotation angle 114 and/or 116 of the spout 112 with respect to one or more axes of rotation, and (2) a rotation actuator 352 for moving the spout 112 to change the spout rotation angle 114 and/or 116, and hence, the position of the spout end 118 of the spout 112 with respect to the storage portion 106. The rotation actuator 352 may include a motor, a linear motor, an electro-hydraulic device, a ratcheting or cable-actuated mechanical device, or another device for moving the spout 112. The spout rotation angle 114 and/or 116 may be a simple angle, a compound angle or multi-dimensional angles that is measured with reference to a reference axis parallel to the direction of travel of the transferring vehicle 100. The rotation sensor 328, the rotation actuator 352, and/or the auger drive 350 may communicate with the vehicle controller 324 through a transmission line or a secondary data bus.

An example rotation actuator 352 that includes an electro-hydraulic device may utilize proportional or non-proportional control valves. Proportional control valves facilitate finer adjustments of the spout rotation angle 114 and/or 116 than what is possible with non-proportional (e.g., bang-bang) valves. Likewise, the rotation actuator 352 may also facilitate fine adjustments of the spout rotation angle 114 and/or 116 by utilizing an electric motor. Systems utilizing electro-hydraulic devices with non-proportional control valves, absent sophisticated control systems as described herein, may be prone to fill the storage container with an inefficient multi-modal or humped distribution of agricultural material with local high areas and local low areas. However, the same systems utilizing control methods as described herein may achieve a distribution of agricultural material closer to a desired distribution. Further control accuracy may be achieved by systems that utilize rotation actuators 352 comprising proportional valves or electric motors. These and other example distributions of agricultural material will be further discussed below in connection with FIG. 6.

The vehicle controller 324 may be coupled to the vehicle data bus 304 to provide a data message to indicate when the auger drive 350 for transferring agricultural material from the transferring vehicle 100 through the spout 112 is active or inactive. In one example, the auger drive 350 may include a rotating helical screw on an auger shaft, an electric motor for driving the auger shaft, and a rotation sensor for sensing rotation or the rate of rotation of the auger shaft. If the vehicle controller 324 indicates that the auger drive 350 of the transferring vehicle 100 is active, the image processing module 302 may activate the container module 306 and the spout module 308. Thus, the auger rotation system 348 and/or the vehicle controller 324 may conserve data processing resources or energy consumption by placing the container module 306 and the spout module 308 in an inactive state (i.e., standby mode) while the transferring vehicle 100 is harvesting, but not transferring, the agricultural material to the receiving vehicle 100.

Figure 5A:
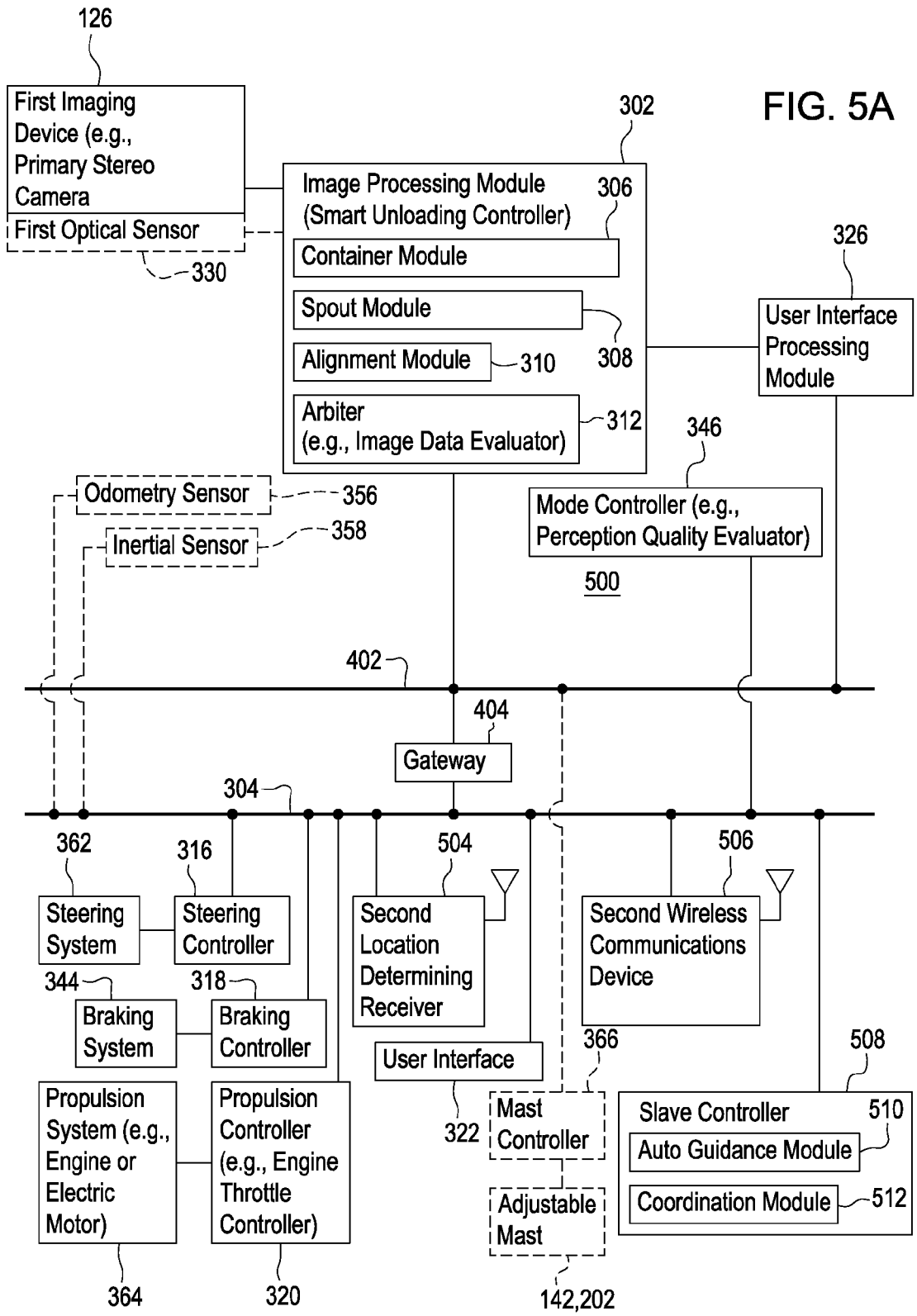
FIG. 5A is a block diagram of an example machine vision-augmented guidance system for a receiving vehicle for facilitating the unloading or transferring of agricultural material from a transferring vehicle to the receiving vehicle (e.g., grain cart and tractor).

The steering controller 316 or the coordination module 342 may adjust the relative position (e.g., the offset components illustrated in FIG. 1A) of the transferring vehicle 100 to the receiving vehicle 102. For example, the steering controller 316 associated with the steering system 362 of the transferring vehicle 100 may steer the transferring vehicle 100 in accordance with a cooperative alignment (e.g., an alignment suitable for efficiently transferring material from the transferring vehicle 100 to the receiving vehicle 102 as both are in generally forward motion) based on location data and motion data from a first location-determining receiver 354 of the transferring vehicle 100 and a second location-determining receiver 504 (FIG. 5A) of the receiving vehicle 102. The alignment module 310, the coordination module 342, and/or the auger rotation system 348 may control the relative position of the spout 112 or the spout end 118 to the container perimeter 120 to achieve an even fill to the desired fill level, with or without such location and motion data from the first and/or second location-determining receivers 354, 504 (FIG. 5A). For example, the rotation actuator 352 or the auger rotation system 348, alone or in combination with the vehicle controller 324, may adjust the spout angle 114 and/or 116.

The spout end 118 may be adjusted for unloading agricultural material by shifting its position within the container perimeter 120 and within a tolerance clearance of the container perimeter 120 to prevent spillage. The spout end 118 may be adjusted by various techniques that may be applied alternately or cumulatively. Under a first technique, the alignment module 310 adjusts the spout end 118 by shifting the spout angle 114 and/or 116. Based on the collected image data for a sampling period, the rotation actuator 352 may adjust the spout angle 114 and/or 116 to place the spout end 118 in cooperative alignment with the storage portion 106.

Under a second technique, the alignment module 310 requests or commands the coordination module 342 to adjust the fore/aft offset adjustment 140 and/or the lateral adjustment 138. Under such a technique, the coordination module 342 manages or choreographs the relative fore/aft offset 140 and lateral offset 138 between the transferring vehicle 100 and the receiving vehicle 102 by moving the transferring vehicle 100 and/or the receiving vehicle 102. Under a third technique, the alignment module 310 primarily adjusts the spout end 118 for unloading agricultural material by shifting the spout angle 114 and/or 116, and the coordination module 342 secondarily and regularly (e.g., periodically) moves the fore/aft offset and the lateral offset by the fore/aft offset adjustment 140 and the lateral adjustment 138, respectively, to achieve a uniform fill state or a level loading of the storage portion 106 with the agricultural material. Accordingly, to achieve a target alignment or desired even distribution of filling the storage portion 106 with agricultural material, the spout end 118 may be adjusted regularly (e.g., in a matrix of one or more rows or columns of preset offset positions) by shifting the spatial relationship between the transferring vehicle 100 and the receiving vehicle 102 by a fore and aft offset or a lateral offset. The spout angle adjustment may be used for fine tuning of the distribution of the agricultural material within the storage portion 106 (e.g., from each position within the matrix).

The optional mode controller 346 is coupled to the data bus 304. Although the mode controller 346 is discussed in connection with the system 300 of FIG. 3, the mode controller 346 may similarly be utilized by systems 400 and 500 of FIGS. 2 and 5A, respectively. The mode controller 346 may include a perception quality evaluator, a judging module, Boolean logic circuitry, an electronic module, a software module, or software instructions for determining whether to operate the machine-vision-augmented guidance system 300 in one of a plurality of operating modes. Example operating modes include (1) an operator-directed manual mode in which one or more human operators steer the receiving vehicle 102 and/or the transferring vehicle 100 as agricultural material is transferred from the transferring vehicle 100 to the receiving vehicle 102; (2) an automated mode in which the receiving vehicle 102 and/or the transferring vehicle 100 are steered and aligned automatically as agricultural material is transferred from the transferring vehicle 100 to the receiving vehicle 102; and (3) a semi-automated mode or partially automated mode in which one or more operators supervise and may override the automated steering and alignment of the transferring vehicle 100 and the receiving vehicle 102. For example, the mode controller 346 may determine whether to use an automated control mode of the spout 112 or an operator-directed manual control mode of the spout 112 based on a first operational status of the first location-determining receiver 354 associated with the transferring vehicle 100, a second operational status of the second location-determining receiver 504 (FIG. 5A) associated with the receiving vehicle 102, and a third operational status of the first imaging device 126 or the image processing module 302.

In one configuration, the automated control mode includes an operational mode where the image processing module 302 processes the collected image data to facilitate the determination of a position of the spout 112 (e.g., the spout end 118) relative to the storage portion 106, the container perimeter 120, or the central zone 134 of the storage portion 106. Further, in the automated control mode, the image processing module 302 may generate command data to place the spout end 118 relative to the storage portion 106, the container perimeter 120, or the central zone 134 of the storage portion 106, such that the spout end 118 is aligned for transferring of agricultural material into the storage portion 106. The command data may comprise one or more of the following: steering command data for the receiving vehicle 102, steering command data for the transferring vehicle 100, or actuator command data for rotating, tilting, deflecting, or otherwise manipulating the spout 112.

In one example, the mode controller 346 includes a perception quality evaluator that evaluates the functionality, diagnostics, performance, tests or quality of one or more location-determining receivers 354, 504 (FIG. 5A), first and second imaging devices 126, 128, range finders, odometrical sensor 356, dead-reckoning sensors, inertial sensors 358, navigation sensors, or other perception sensors. In one illustrative example, the first operational status is acceptable if the first location-determining receiver 354 provides reliable position data that meets or exceeds a dilution of precision threshold or another navigation satellite reliability measurement during a sampling period. The second operational status is acceptable if the second location-determining receiver 504 (FIG. 5A) provides reliable position data that meets or exceeds a dilution of precision threshold or another navigation satellite reliability measurement (e.g., total equivalent user range error) during a sampling period. Further, the third operational status is acceptable if the first imaging device 126 provides reliable image data in which the container module 306, the spout module 308, or the respective edge detection modules therein are capable of any of the following: (1) reliably identifying or resolving one or more edges of the spout 112, the spout end 118, the container perimeter 120 or a portion thereof, or the storage portion 106 in the collected image data during a sampling time period, (2) reliably identifying on a time percentage basis (e.g., at least 99.99% of the time) one or more reference objects (e.g., a reference pattern or reference image on the spout 112 or the receiving vehicle 102) or objects in the image data, (3) reliably determining (e.g., via stereo correspondence or disparity processing) coordinates (e.g., in three dimensions) of a material portion (e.g., a group or constellation of reference points) on one or more of the spout 112, the spout end 118, the storage portion 106, container perimeter 120 or a portion thereof during a sampling period, or (4) reliably identifying one or more edges of the spout end 118 and one or more edges 136 of the container perimeter 120 of the storage portion 106.

The position and/or the coordinates (e.g., three dimensional coordinates) of the spout 112 and/or the spout end 118 may be calculated using the detected rotation angle 114 and/or 116 of the spout 112 along with a known length of the spout 112. However, where the rotation angle 114 and/or 116 or the rotation sensor 328 is not present, operating, or in communication with the image processing module 302, the spout module 308 may use image processing for any of the following: (1) to estimate a spout angle 114 and/or 116, (2) to estimate a spout position (e.g., three dimensional coordinates) of the spout 112, and (3) to estimate a spout position (e.g., three dimensional coordinates) of the spout end 118.

Dilution of precision provides a figure of merit of the performance of the location-determining receivers 354, 504 (FIG. 5A) that uses a satellite navigation system, such as the Global Positioning System (GPS) or the Global Navigation Satellite System (GLONASS). Dilution of precision captures the time-varying impact of spatial geometry and separation between the location-determining receivers 354, 504 (FIG. 5A) and satellite signals that are received by the location-determining receivers 354, 504 (FIG. 5A), without clock errors, ionospheric errors, multipath errors, and other errors. The precision in pseudo-range estimate to each satellite may affect the accuracy of the determination of a three dimensional position estimate and may affect the time estimate of the location-determining receivers 354, 504 (FIG. 5A). If receivable navigation satellites are spatially too close together in orbit for location-determining receivers 354, 504 (FIG. 5A) at a particular time, accuracy of the position estimate may be compromised and the dilution of precision value may be higher than what is normal or acceptable.

In one example, the first location-determining receiver 354 provides a first indicator message that indicates that the first location-determining receiver 354 meets or exceeds a precision dilution threshold. The second location-determining receiver 504 (FIG. 5A) provides a second indicator message that indicates that the second location-determining receiving 504 (FIG. 5A) exceeds a precision dilution threshold. The image processing module 302 provides a third indicator message indicating that the image processing module 302 is capable of reliably identifying one or more edges of the spout end 118 and one or more edges of the container perimeter 120 of the storage portion 106 during a sampling period.

If the mode controller 346 is separate from the image processing module 302, a measure of redundancy and reliability is added to the system 300 because any failure or disruption of the functioning of the image processing module 302, or the hardware or the software of the image processing module 302 is generally separate and distinct from any failure or disruption of the functioning of the mode controller 346. Although the mode controller 346 is shown separate from and outside of the image processing module 302, in an alternate example the mode controller 346 may be incorporated into the image processing module 302 to potentially reduce the cost of the system 300.

The master/slave controller 340 is coupled to the data bus 304. In one example, the master/slave controller 340 includes an auto-guidance module 360 and the coordination module 342. The auto-guidance module 360 or the master/slave controller 340 may control the transferring vehicle 100 in accordance with location data from the first location-determining receiver 354 and a path plan or desired vehicle path (e.g., a desired vehicle path stored in a data storage device 336). The auto-guidance module 360 or the master/slave controller 340 sends command data to the steering controller 316, the braking controller 318, and the propulsion controller 320 to control the path of the transferring vehicle 100 to track automatically a path plan or to track manually a steered course of an operator via the user interface 322 or the steering system 362.

The coordination module 342 may facilitate alignment of movement (e.g., choreography) between the transferring vehicle 100 and the receiving vehicle 102 during unloading or transferring of agricultural material between the vehicles. For example, the coordination module 342 may facilitate maintenance of the uniform lateral offset 138 and the uniform fore/aft offset 140 between the vehicles 102, 100 during unloading of the agricultural material, subject to any adjustments for attainment of a uniform distribution of material in the storage portion 106. Collectively, the uniform lateral offset 138 and the uniform fore/aft offset 140 may be referred to as a uniform spatial offset. In certain examples, maintenance of the lateral offset 138 and the fore/aft offset 140 or coordination of any shift in the lateral offset 138 and the fore/aft offset 140 (e.g., pursuant to a two-dimensional matrix of pre-established positions (x, y points) for uniform loading of a respective particular container 108 or the storage portion 106 is a necessary or desired precondition to implementing spout angle adjustment of the spout 112 or the spout end 118 by the alignment module 310.

In one example, the transferring vehicle 100, in a leader mode, is steered by the auto-guidance module 360 or the steering controller 316 in accordance with path plan or by a human operator. The master/slave controller 340 or the coordination module 342 controls the receiving vehicle 102 in a follower mode via a slave/master controller 508 (FIG. 5A) in which the transferring vehicle 100 operates in the leader mode. If the transferring vehicle 100 operates in an automated mode or an auto-steering mode, the master/slave controller 340 provides command data locally to the steering controller 316, braking controller 318, and the propulsion controller 320 of the transferring vehicle. Such command data may be normalized (i.e., scaled), time stamped, and communicated to the receiving vehicle 102 via the wireless communication devices 338, 506 (FIG. 5A) for processing by the slave/master controller 508 (FIG. 5A). Alternatively, the velocity, the acceleration, and the heading data of the transferring vehicle 100 is communicated to the receiving vehicle 102 via the wireless communication devices 338, 506 (FIG. 5A) to enable the receiving vehicle 102 to follow the path of the transferring vehicle 100 with a minimal time delay. In an automated mode and in a leader-follower mode, the receiving vehicle 102 and/or the transferring vehicle 100 are steered and aligned automatically during transfer of agricultural material from the transferring vehicle 100 to the receiving vehicle 102.

The image processing module 302 provides image data to the user interface processing module 326 that provides, directly or indirectly, status message data and performance message data to the user interface 322. As illustrated in FIG. 3, the image processing module 302 communicates with the vehicle data bus 304 (e.g., Controller Area Network (CAN) data bus).

In one example, the location-determining receiver 354, the first wireless communication device 338, the vehicle controller 324, the steering controller 316, the braking controller 318, and the propulsion controller 320 are capable of communicating over the vehicle data bus 304. In turn, the steering controller 316 is coupled to a steering system 362 of the transferring vehicle 100, the braking controller 318 is coupled to the braking system 344 of the transferring vehicle 100, and the propulsion controller 320 is coupled to a propulsion system 364 of the transferring vehicle 100.

The steering system 362 may have an electrically-driven steering system, an electro-hydraulic steering system, a gear driven steering system, a rack and pinion gear steering system, or another steering system that changes the heading of the vehicle or one or more wheels of the vehicle. The braking system 344 may comprise a regenerative braking system, an electro-hydraulic braking system, a mechanical breaking system, or another braking system capable of stopping the vehicle by hydraulic, mechanical, friction or electrical forces. The propulsion system 364 may have one or more of the following: (1) a combination of an electric motor and an electric controller, (2) an internal combustion engine that is controlled by an electronic fuel injection system or another fuel metering device that may be controlled by electrical signals, or (3) a hybrid vehicle in which an internal combustion engine drives a electrical generator that is coupled to one or more electric drive motors.

An optional mast controller 366 may be coupled to the vehicle data bus 304, the implement data bus, or the image processing module 302 to control an optional first support 142, 202 for mounting and adjustably positioning the first and/or second imaging device 126, 128. The mast controller 366 is adapted to change the orientation (e.g., the compound angular orientation) or height above ground of the first and/or second imaging device 126, 128 mounted to the first support 142, 202. The orientation may be expressed as, for example, a tilt angle, a pan angle, a down-tilt angle, a depression angle, or a rotation angle.

In one configuration, the user interface 322 is arranged for entering container reference data or dimensional parameters related to the receiving vehicle 102. For example, the container reference data or dimensional parameters may include a distance between a trailer hitch or pivot point, which interconnects the propelled portion 104 and the storage portion 106, and front wheel rotational axis of the storage portion 106 of the receiving vehicle 102.

In an alternate example, as illustrated by the dashed lines in FIG. 3, the system 300 further may include the optional odometrical sensor 356 (e.g., odometer) and the optional inertial sensor 358. To estimate a distance traveled by the transferring vehicle during a measurement time period or a ground speed of the transferring vehicle, the odometrical sensor 356 may comprise a magnetic rotation sensor, a gear driven sensor, or a contactless sensor for measuring the rotation of one or more wheels of the transferring vehicle. The odometrical sensor 356 may be coupled to the vehicle data bus 304 or an implement data bus. The inertial sensor 358 may have one or more accelerometers, gyroscopes, or other inertial devices coupled to the vehicle data bus 304 or an implement data bus. The optional odometrical sensor 356 and the optional inertial sensor 358 may augment or supplement position data or motion data provided by the first location-determining receiver 354.

The vision-augmented guidance system 400 of FIG. 4 is similar to the system 300 of FIG. 3; however, the system 400 of FIG. 4 further includes an implement data bus 402, a gateway 404, and a vehicle controller 406 coupled to the vehicle data bus 304 for optional lights 408 and a spout 410. The spout 410 is well suited for use with a self-propelled forage harvester, whereas the spout 112 is well suited for use with a combine. However, either spouts 410 or 112 may be used with combines, harvesters, or other heavy equipment. The vehicle controller 406 controls the lights 408; a spout controller 412 controls the spout 410 via one or more of the following: a rotation actuator 414, a tilt actuator 416, or a deflector actuator 418. For example, the rotation actuator 414 may rotate the spout 410 about a first axis that is generally perpendicular to the ground. The tilt actuator 416 may tilt or rotate the spout 410 at an upward or downward angle along a second axis that may be generally parallel to the ground or substantially perpendicular to the first axis. The deflector actuator 418 may activate a deflector at or near an end of the spout 410 to avoid overshooting or undershooting the storage portion 106 of the receiving vehicle 102 with harvested material. In one example, each of the rotation actuator 414, the tilt actuator 416, and the deflector actuator 418 may have a servo-motor, an electric motor, or an electro-hydraulic mechanism for moving or adjusting the orientation or spout angle of the spout 410 or the end thereof.

In one configuration, the spout controller 412 controls the spout 410 based on operator input. In another configuration, the spout controller 412 controls the spout 410 via the image processing module 302 based on sensor data from one or more of the following sensors: a rotation sensor 420, a tilt sensor 422, and a deflector sensor 424. The rotation sensor 420 measures a first angle of rotation of the spout 410 about a first axis that is generally perpendicular to the ground; the tilt sensor 422 measures a second angle of rotation (i.e., a tilt angle) of the spout 410 at an upward or downward angle along a second axis that may be generally parallel to the ground or substantially perpendicular to the first axis. The deflector sensor 424 may measure a deflector angle, a deflector active status, or a deflector inactive status at or near an end of the spout 410 to avoid overshooting the storage portion 106 of the receiving vehicle 102 with harvested material. In one example, each of the rotation sensor 420 and the tilt sensor 422 may have a magnetic field sensor, a Hall Effect sensor, a magnetostrictive sensor, a magnetoresistive sensor, a variable resistor, or another suitable sensor for measuring an angle between the spout 112 and the transferring vehicle 100, with respect to rotation along the first axis, the second axis, or otherwise. In one configuration, the deflector sensor 424 may include a contact sensor or contact switch to provide a status message or status signal indicative of whether the deflector is extended or retracted with respect to the spout end 118.

In one configuration, the implement data bus 402 may comprise a Controller Area Network (CAN) implement data bus. Similarly, the vehicle data bus 304 may comprise a controller area network (CAN) data bus. In an alternate example, the implement data bus 402 and/or the vehicle data bus 304 may comprise an ISO (International Organization for Standardization) data bus or ISOBUS, Ethernet, or another data protocol or communications standard.

The gateway 404 supports secure or controlled communications between the implement data bus 402 and the vehicle data bus 304. The gateway 404 may include a firewall (e.g., hardware or software), a communications router, or another security device that may restrict or prevent a network element or device on the implement data bus 402 from communicating (e.g., unauthorized communication) with the vehicle data bus 304 or a network element or device on the vehicle data bus 304. The security device of the gateway 404 may allow such communication if the network element or device on the implement data bus 402 follows a certain security protocol, handshake, password and key, or another security measure. Further, in one example, the gateway 404 may encrypt communications to the vehicle data bus 304 and decrypt communications from the vehicle data bus 304 if a proper encryption key is entered or other security measures are satisfied. The gateway 404 may allow network devices on the implement data bus 402 that communicate via an open standard or third party hardware and software suppliers. In contrast the network devices on the vehicle data bus 304 are solely provided by the manufacturer of the transferring vehicle (e.g., self-propelled forage harvester) or those authorized by the manufacturer.

In FIG. 4, a first location-determining receiver 354, a user interface 322, a user interface processing module 326, and the gateway 404 are coupled to the implement data bus 402. In other examples, such elements or network devices may be connected to the vehicle data bus 304. The vehicle controller 406 and the spout controller 412 are coupled to the vehicle data bus 304. In turn, the vehicle controller 406 and the spout controller 412 are coupled, directly or indirectly, to optional lights 408 on the transferring vehicle 100 and the spout 112 of the transferring vehicle 100. Although the system 400 of FIG. 4 is well suited for use or installation on a self-propelled forage harvester, the system 400 of FIG. 4 may also be applied to combines, harvesters, or other heavy equipment.

Figure 5B:
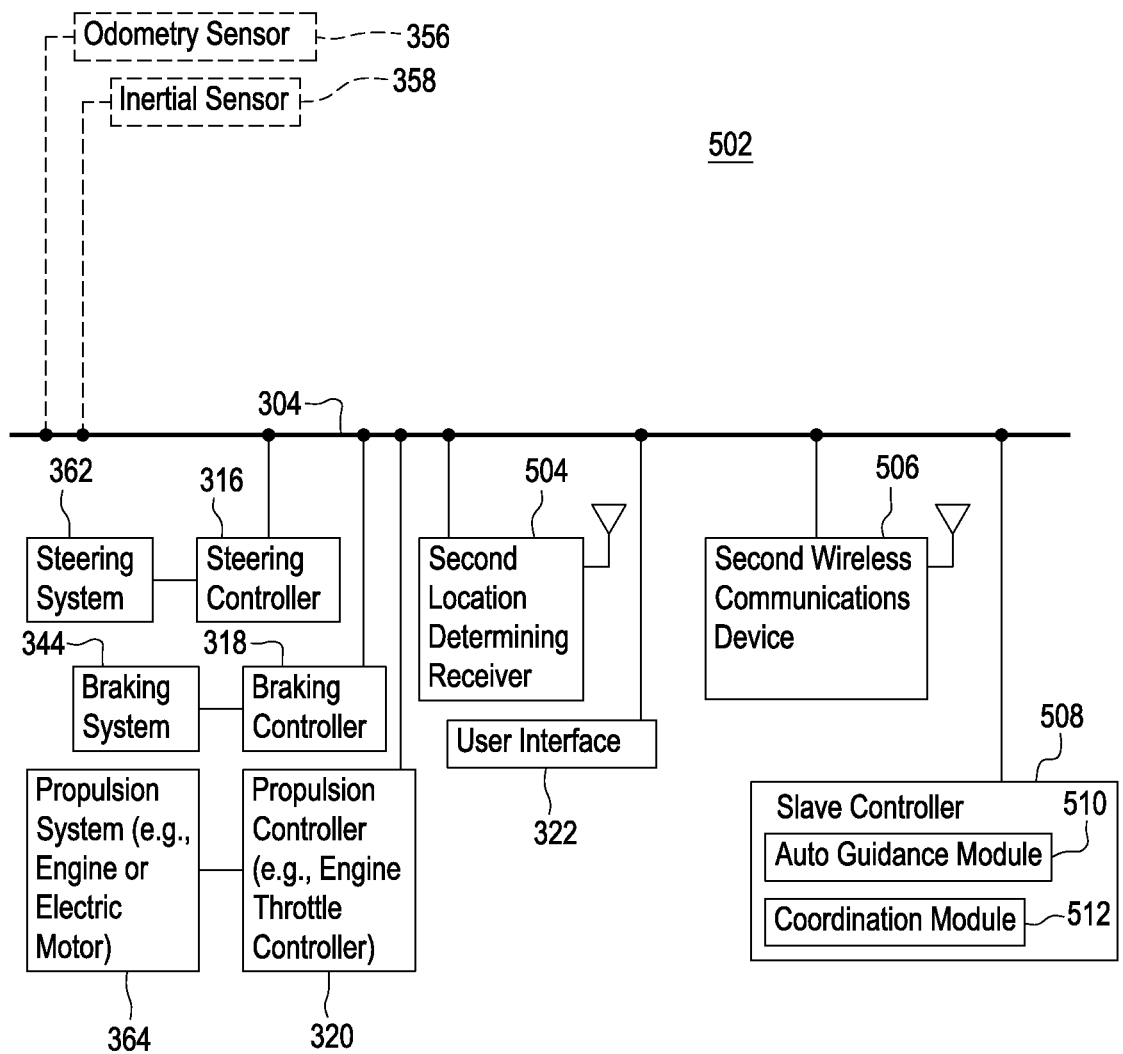
FIG. 5B is a block diagram of an example electronic guidance system for a receiving vehicle for cooperation with the machine vision-augmented guidance system of FIG. 3 or FIG. 4.

The system 300 of FIG. 3 and the system 400 of FIG. 4 apply to the transferring vehicle 100, whereas systems 500 and 502 of FIGS. 5A and 5B, respectively, apply to the receiving vehicle 102. In particular, the system 500 of FIG. 5A is presented as an image processing module 302 that is positioned on the receiving vehicle 102, and the system 502 of FIG. 5B is configured to cooperate with the system 300 or 400 of FIG. 3 or FIG. 4.

The system 500 of FIG. 5A includes the first imaging device 126, the image processing module 302, the user interface processing module 326, the gateway 404, a second location-determining receiver 504, a second wireless communication device 506, and a slave/master controller 508, among other devices illustrated in FIG. 3. In one example, the first imaging device 126 is mounted on the propelled portion 104 (e.g., a tractor) of the receiving vehicle 102 facing towards the storage portion 106. The second wireless communication device 506 of the receiving vehicle 102 may be adapted for communicating data with the first wireless communication device 338 of the transferring vehicle 100 of FIG. 3 or FIG. 4. The second location-determining receiver 504 may provide position data, location data, altitude, velocity, or acceleration data.

As illustrated in FIG. 5A, the image processing module 302 may estimate the relative position of the transferring vehicle 100 and the receiving vehicle 102. The image processing module 302 may also estimate the relative orientation of the spout end 118 with respect to the storage portion 106 to direct or control the steering system 362, the braking system 344, and the propulsion system 364 of the receiving vehicle 102 via one or more controllers 316, 318, 320. The image processing module 302 may make such estimates to place the transferring vehicle 100 and receiving vehicle 102 in a target transferring position for transferring of material from the spout end 118 to the storage portion 106. For example, the target transferring position or cooperative alignment may refer to registration or alignment of the spout position and the container position (e.g., for one or more sampling time periods). Meanwhile, the transferring vehicle 100 may be controlled (with respect to, e.g., steering, velocity, and acceleration) by its own operator or the first location-determining receiver 354. For example, the system 500 or the image processing module 302 may identify the spout end 118 compute (via stereo correspondence, disparity or other image processing) the relative position of the spout end 118 to the storage portion 106, the container perimeter 120 of the storage portion 106, and/or the central zone 134 of the storage portion 106.

In the example of FIG. 5A, the steering controller 316 associated with the steering system 362 of the receiving vehicle 102 may steer the propelled portion 104 of the receiving vehicle 102 in accordance with a cooperative alignment (e.g., alignment suitable for efficient transferring of material from the transferring material to the receiving vehicle 102) based on location data and motion data from the first location-determining receiver 354 and the second location-determining receiver 504. With or without such location and motion data from one or more of the location-determining receivers 354, 504, the image processing module 302 may steer the propelled portion 104 of the receiving vehicle 102 to maintain the cooperative alignment for unloading or transferring material between the vehicles by using image data to align the spout 112 or the spout end 118 with the storage portion 106 or the container perimeter 120 of the receiving vehicle.

In an example configuration of FIG. 5B, the transferring vehicle 100 and the receiving vehicle 102 operate in a leader-follower configuration in which the transferring vehicle 100 is in the lead role and the receiving vehicle 102 is in the following role, such that the receiving vehicle 102 tracks or follows the heading, the velocity, and optionally the acceleration of the lead vehicle with a target spatial offset. In FIG. 5B, the image processing module 302 may be active only on the transferring vehicle 100 and may be inactive or not present on the receiving vehicle 102. On the transferring vehicle 100, the image processing module 302 and the first location-determining receiver 354 may provide image guidance data, if available, and/or reliable, and first motion data (e.g., location, heading, velocity, and acceleration), respectively, that are used by the transferring vehicle 100 and the receiving vehicle 102 for guidance.

In one example configuration, the image guidance data and/or the first motion data are transmitted by the first wireless communication device 338 on the transferring vehicle 100 to the second wireless communication device 506 on the receiving vehicle 102. On the receiving vehicle 102, the slave/master controller 508 may receive the first motion data and the first location data from the first location-determining receiver 354 on the transferring vehicle 100, and the second motion data and second location data from the second location-determining receiver 504 on the receiving vehicle 102. The slave/master controller 508 may generate an error or control data for controlling the steering system 362, the braking system 344, and the propulsion system 364 of the receiving vehicle 102. The error or control data may be based on a difference between the first motion data and the second motion data and/or the difference between the first location data and the second location data.

In another example configuration, the master/slave controller 340 on the transferring vehicle 100 may send control signals or control data messages to the slave/master controller 508 on the receiving vehicle 102 to control the steering system 362, the braking system 344, or the propulsion system 364 of the receiving vehicle 102. The master/slave controller 340 may send such signals or messages to the slave/master controller 508 to optimize the relative position of the spout end 118 to the storage portion 106 of the container 108, to optimize the target spatial separation between the vehicles, or to avoid an imminent collision between the vehicles 102, 100. On the receiving vehicle 102, the slave/master controller 508 may operate in a slave mode or follower mode under the control of the master/slave controller 340. An auto-guidance module 510 and a coordination module 512 within the slave/master controller 508 may provide guidance of the receiving vehicle 102 consistent with location data and a path plan or consistent with other guidance data or command data from the master/slave controller 340 to the transferring vehicle 100.

In FIG. 5A or FIG. 5B, the system 500 or 502 for the receiving vehicle 102 may be used in conjunction with the system 300 or 400 of the transferring vehicle 100 of FIG. 3 or FIG. 4. The second wireless communication device 506 may be coupled to the vehicle data bus 304. The wireless communication devices 338, 506 may exchange or communicate position data, relative position data, command data, or control data for controlling, adjusting or coordinating the position and orientation of the vehicles, and, more particularly, the position and the orientation of the spout 112 or spout end 118 over the central zone 134 of the container 108. The communicated data between the wireless communication devices 338, 506 may include any of the following data: (1) position data or location data from either location-determining receiver 354 or 504, (2) command or guidance data from an image processing module 302 on the transferring vehicle 100 or the receiving vehicle 102, (3) command or guidance data from the master/slave controller 340 or the coordination module 512, (4) command or guidance data from the slave/master controller 508 or the coordination module 512 or (5) alignment data (e.g., data concerning relative position of the imaging devices, relative position of reference points on the vehicles, and relative alignment between the spout end 118 and the container perimeter 120) from the alignment module 310. For example, to determine a relative alignment between the spout end 118 and the container perimeter 120, the image processing module 302 or alignment module 310 may use first location data of the first location-determining receiver 354 and second location data of the second location-determining receiver 504 to determine a relative position or spatial offset between the two vehicles 102, 100 or a relative position of the first imaging device 126 and the second imaging device 128.

The system 500 of FIG. 5A may support different configurations or combinations of electronic systems (e.g., systems 300 and 500 or 400 and 500) of the transferring and receiving vehicles 100, 102. In a first configuration, the first imaging device 126 may be disposed on the receiving vehicle 102 instead of, or in addition to, one or more of the first or second imaging devices 126, 128 on the transferring vehicle 100. In a second configuration, the system 500 of FIG. 5A may provide collected image processing data from the receiving vehicle 102 to the transferring vehicle 100 via the transmission of the collected image processing data from the second wireless communication device 506 and to the first wireless communication device 338. Here, in a second configuration, the collected imaging processing data from the receiving vehicle 102 may be referred to as supplementary data, complementary image data, or additional image data. The additional image data may provide additional perspective or viewpoints that may supplement the image data collected by the transferring vehicle 100. For example, the additional image data may provide more accurate or supplement image data when the image data collected by the transferring vehicle 100 is affected by moisture, dust, poor ambient lighting, glare or reflections that do not similarly impair or impact the additional image data.

An optional odometrical sensor 356 may be coupled to the vehicle data bus 304 or the implement data bus 402. An inertial sensor 358 may have one or more accelerometers, gyroscopes or other inertial devices coupled to the vehicle data bus 304 or the implement data bus 402.

Figure 6:
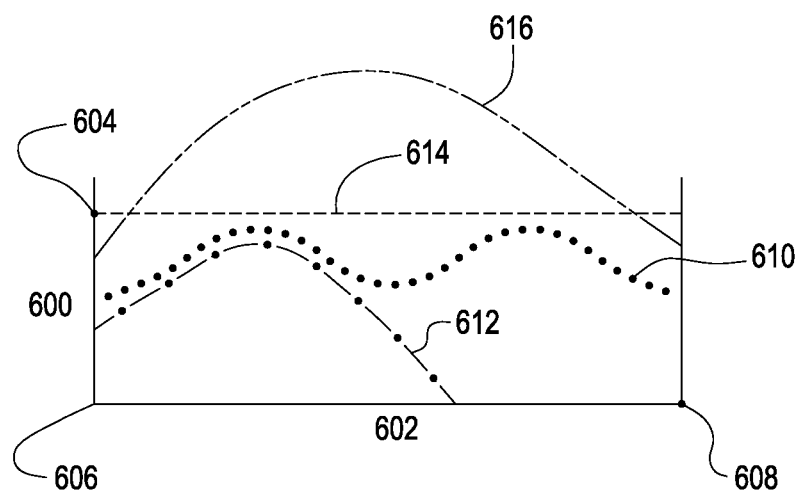
FIG. 6 is a two-dimensional representation of various possible illustrative distributions of material in the interior of a container or storage portion, consistent with a cross-sectional view along reference line 2C-2C in FIG. 2A.

FIG. 6 illustrates a two-dimensional representation of various possible illustrative distributions of material in the container 108, consistent with a view along reference line 6-6 in FIG. 2A. In one configuration, the y axis is coincident with the longitudinal axis or direction of travel of the container 108, the z axis is coincident with the height of material in the container 108, and the x axis is perpendicular to the direction of travel of the container 108. In such a configuration, the x, y and z axes are generally mutually orthogonal to each other.

In the chart of FIG. 6, the vertical axis represents a mean height ($\bar{z}$) 600 of the material in the container 108, the horizontal axis represents a longitudinal axis (y) 602 of the container 108, and the dashed line on the vertical axis indicates the maximum capacity or container capacity 604. A front 606 of the container 108 is located at the origin, whereas a back 608 of the container 108 is located on the vertical axis.

FIG. 6 shows four illustrative distributions of material within the container 108. The first distribution is a bimodal profile 610 in which there are two main peaks in the distribution of material in the container 108. The bimodal profile 610 is shown as a dotted line. The bimodal profile 610 may occur where the spout angle adjustment is governed by an electrohydraulic system with non-proportional valves. Likewise, multimodal distributions with more than two main peaks may be observed. Bimodal profiles 610 or multimodal profiles may exist if material transfer occurs at a small number of discrete relative positions between the spout end 118 and the container 108. In this example, the transferred material forms discrete piles, thereby defining the bimodal 610 or multimodal distribution profiles.

The second distribution is the front-skewed modal profile 612 in which there is single peak of material toward the front of the container 108. The front-skewed modal profile 612 is shown as alternating long and short dashes. The second distribution may occur where the volume or length (y) of the container 108 is greater than a minimum threshold and where the relative alignment between the spout end 118 and the container 108 is generally stationary during a substantial portion of unloading of the material.

The third distribution is a desired profile, such as a uniform profile 614 which may be achieved by following a suitable fill strategy as disclosed in this document. For example, during unloading, the angle of the spout 112 may be adjusted to promote uniform distribution of the agricultural material in the storage portion 106 of the container 108. In other examples, the desired profile may be a sloped profile 616. The angle of the spout 112 may be adjusted in lieu of, or in addition to adjusting the relative offset spacing between the transferring vehicle 100 and the receiving vehicle 102.

Figure 7:
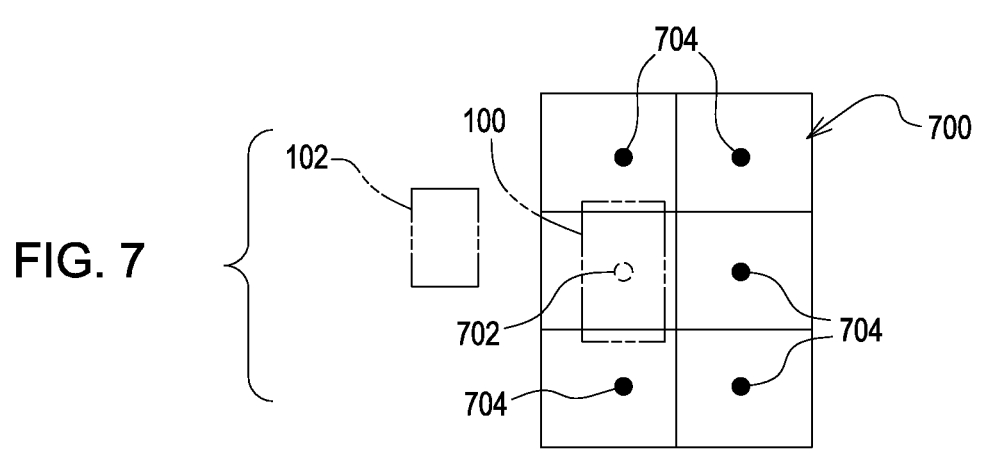
FIG. 7 is a plan view of a transferring vehicle and a receiving vehicle, where the transferring vehicle is aligned within a matrix of possible offset positions.

FIG. 7 illustrates example strategies of adjusting the relative offset spacing between the transferring vehicle 100 and the receiving vehicle 102. FIG. 7 is a plan view of a transferring vehicle 100 and a receiving vehicle 102, in which the transferring vehicle 100 is aligned within a matrix 700 of possible offset positions 702, 704 between the transferring and receiving vehicle 102, 100. Each offset position 702, 704 may be defined in terms of a combination of a unique lateral offset 138 and a unique fore/aft offset 140 between the vehicles 102, 100. As shown, the matrix 700 is a two-dimensional, 2×3 matrix (i.e., 2 columns by 3 rows) of possible offset positions 702, 704. Although six possible matrix positions 702, 704 are shown in FIG. 7, in alternate examples the matrix 700 may have any number of possible offset positions greater than or equal to two. Here, the transferring vehicle 100 occupies a current offset position 704 in the first column and the second row of the matrix 700, whereas the other possible offset positions 702 are not occupied by the transferring vehicle 100. Any of the systems 300, 400, 500 may direct the image processing module 302, the master/slave controller 340 of the transferring vehicle 100, or the slave/master controller 508 of the receiving vehicle 102 to shift to any unoccupied or other possible offset positions 702 within the matrix 700 to promote or facilitate an even distribution of agricultural material within the container 108 or storage portion of the receiving vehicle 102. The spatial offset between the transferring vehicle 100 and the receiving vehicle 102 may be adjusted in accordance with the matrix 700 or another matrix of preset positions of spatial offset to promote even distribution of agricultural material in the storage portion of the receiving vehicle 102, if such matrix is associated with a unique, relative lateral offset 138 and fore/aft offset 140 between the vehicles 102, 100.

In one example of FIG. 7, both the transferring vehicle 100 and the receiving vehicle 102 may be moving forward at approximately the same velocity and heading (e.g., within a tolerance or error of the control systems during harvesting), where the relative position of the receiving vehicle 102 is generally fixed or constant with respect to each position 702, 704 in the matrix 700 that the transferring vehicle 100 may occupy.

In an alternate example, the receiving vehicle 102 may be shown as occupying a two dimensional matrix (e.g., a 3×3 matrix having three columns and three rows) of possible offset positions, while the position of the transferring vehicle 100 is generally fixed or constant with respect to each position of matrix that the receiving vehicle 102 may occupy. As directed by any of the systems 300, 400, 500, the image processing module 302 or the slave/master controller 508 of the receiving vehicle 102 may shift to any unoccupied or other possible offset positions within the matrix to promote or facilitate an even distribution of agricultural material within the storage portion 106 of the container 108 of the receiving vehicle 102.

FIGS. 8A-10 described an example control strategy for achieving a desired fill profile. In an example strategy, the system 300 may include the ability to detect and fill voids in agricultural material within the storage portion 106 of the receiving vehicle 102. Voids may be thought of as underutilized space within the storage portion 106. By detecting and filling voids, the distribution of agricultural material within the storage portion 106 may be optimized to a desired fill profile. Voids may be related to the difference between a fill level of agricultural material and a desired fill level set point. Additionally or alternatively, voids may be related to the relative volumetric difference in agricultural material between different sections of the storage portion 106.

FIG. 8A is an example fill model 800 of the storage portion 106 of the container 108 of the receiving vehicle 102 that is shown relative to a plan view of the storage portion 106. The example fill model 800 is one possible model that the image processing module 302 may create from inputs from the system 300. Such inputs may include but are not limited to inputs from the first and second imaging devices 126, 128, the vehicle controller 324, the vehicle data bus 304, and modules within the image processing module 302. The system 300 may use the fill model 800 to identify the fill level and the fill profile of agricultural material within various sections of the storage portion 106 to identify voids within the agricultural material and to command the spout 112 to fill the voids.

The fill model 800 includes the container 108, which is bounded by its perimeter 120. The fill model 800 is considered relative to a top view of the container 108, and the perimeter 120 may represent the top rim of the container 108. The perimeter 120 defines the storage portion 106 inside of the perimeter 120 and an external portion 802 outside of the perimeter 120. The fill model 800 may further include a buffer zone (not shown) to offset the central zone 134 of the storage portion 106 from the perimeter 120. The buffer zone may be utilized to ensure that material is not transferred or spilled outside of the storage portion 106 and into the external portion 802. The storage portion 106 may be divided into a plurality of cells, one of which is designated with reference numeral 804.

The cells 804 in the example of FIG. 8A are rectangular in shape and define a rectilinear grid within the storage portion 106; however, in other examples, the cells 804 may be shaped as squares, rectangles, triangles, hexagons, octagons or any other polygonal shapes. The cells 804 may each represent individual measurements of material fill levels within the storage portion 106. In other examples, the fill model 800 may include more or fewer cells 804.

Turning to FIG. 8B, the storage portion 106 is shown as divided into a plurality of columns 806. The columns 806 are substantially perpendicular to the longitudinal axis 602 of the storage portion 106 of the container 108. In the example fill model 800 as depicted in FIG. 8B, the columns 806 span the width of the container 108, and each column 806 includes a plurality of adjacent cells 804. While the columns 806 are shown as an aggregation of a single column of cells 804, the columns 806 may aggregate cells 804 in any suitable manner.

For example, as shown in FIG. 8C, the storage portion 106 may be divided into a plurality of zones 808 with each zone 808 comprising a plurality of columns 806.

FIG. 8D illustrates the example fill model 800 having cells 804, columns 806, zones 808, and an example void area 810. FIG. 8D illustrates that the void area 810 may extend across multiple columns 806 and zones 808. The parameters defining the zones 808 and the void areas 810, respectively, are independent of each other. Furthermore, the respective sizes of the cells 804, the columns 806, the zones 808, and/or the void areas 810 may be adjustable depending on operator preferences, and/or characteristics of the transferring vehicle 100 and/or the storage portion 106 of the container 108. The cells 804, the columns 806, the zones 808, and the void area 810 all represent sections of the storage portion 106 according to one example of the system 300 and are not intended to limit the scope of this disclosure. In other examples, the system 300 may utilize one or more of the cells 804, the columns 806, the zones 808, and/or the void areas 810.

Figure 9:
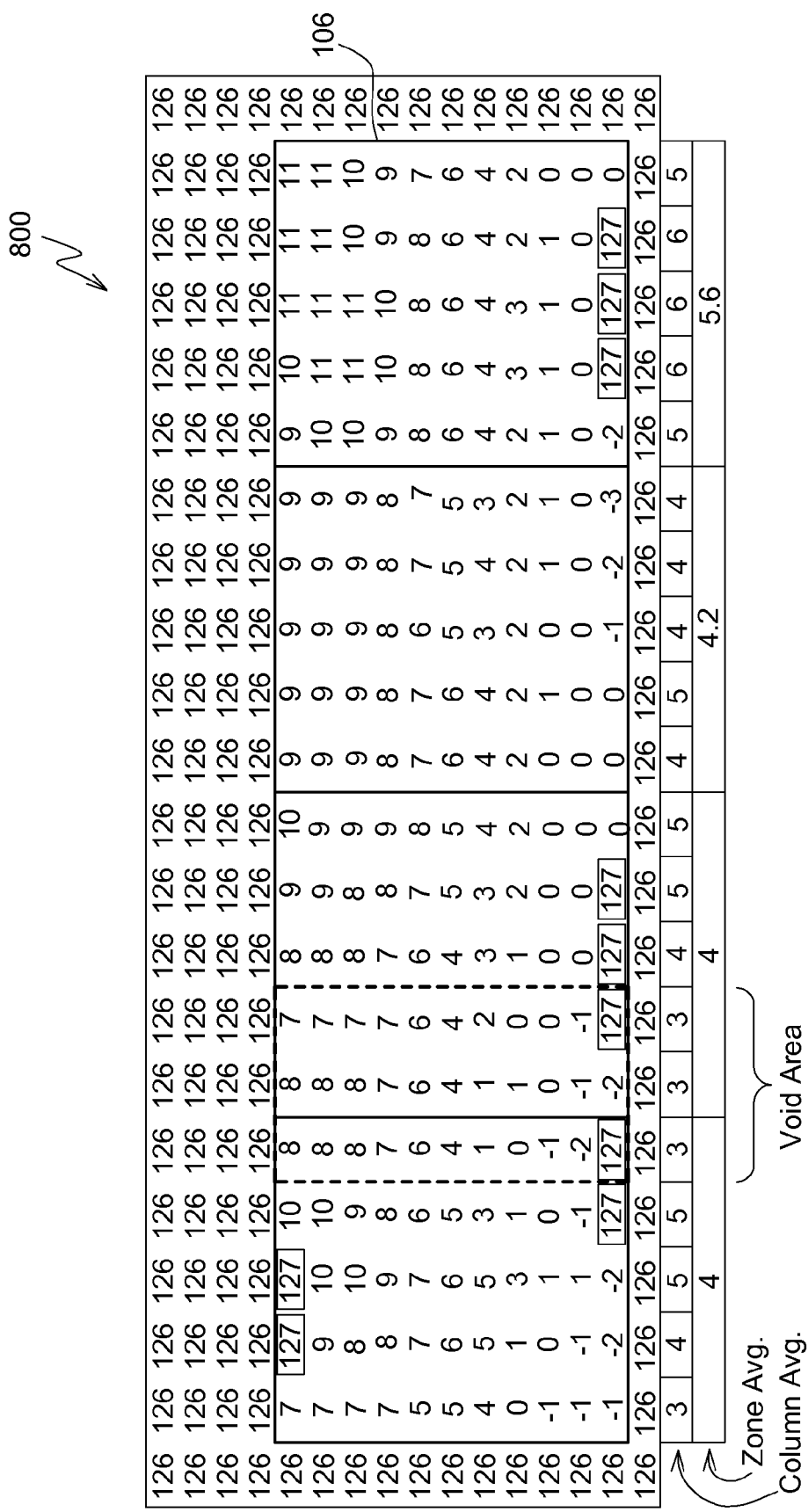
FIG. 9 is the example fill model of FIG. 8A with example fill data.

FIG. 9 depicts an example fill model 800 of FIGS. 8A-8D with example fill level data determined by the image processing module 302 based on the image data collected by the first and/or second imaging devices 126, 128, as described above. Each cell 804 within the storage portion 106 is assigned a value representative of the fill level of the section of the storage portion 106 corresponding to the cell 804 or a value representative of areas that are unreadable or that are external to the storage portion 106. The fill level is the height to which the storage portion 106 may be filled with agricultural material, as measured or determined by the image processing module 302 based on the image data collected by the first and/or second imaging devices 126, 128, as described above. The fill level represents a single dimensional value representing a measured length; however, material volume may be calculated based on the fill level with respect to the size and geometry of the section of the storage portion 106 corresponding to a cell 804.

In some circumstances as shown in FIG. 9, the fill level of one or more cells 804 is unreadable and is assigned a value indicating as such, which in the example of FIG. 9 is 127. The cells outside of the storage portion 106 in the external portion 802 are assigned a value indicating as such, which in the example of FIG. 9 is 126. The remaining values correspond to the fill levels of sections of the storage portion 106 corresponding to each cell 804, relative to a datum. In the example of FIG. 9, the datum is the top rim of the storage portion 106; however, in other examples, the datum may be the bottom surface of the storage portion 106, the ground, the position of the spout end 118, or other datums. The fill level values represent the fill level with respect to the datum or to an offset from the datum. Furthermore, each increment of a fill level value may represent a measurement of length. For example, each incremental fill level value may represent 5 centimeters, such that a fill level value of 1 represents 5 cm above the datum, a fill level value of −1 represents 5 centimeters below the datum, and a fill level of 4 represents 20 centimeters above the datum. In other examples, it may be desirable to use a non-linear fill level scale.

The fill model 800 is assigned one or more fill level set points, which represent the desired fill level for each cell. In the example of FIG. 9, the fill level set point is 4, and is uniform across the entire storage portion 106. In other examples, the fill level set points may vary amongst the cells 804 of the storage portion 106. For example, it may be desirable to have a higher fill in the center of the storage portion 106 to achieve the sloped profile 507 as described above in connection with FIG. 6.

Figure 10:
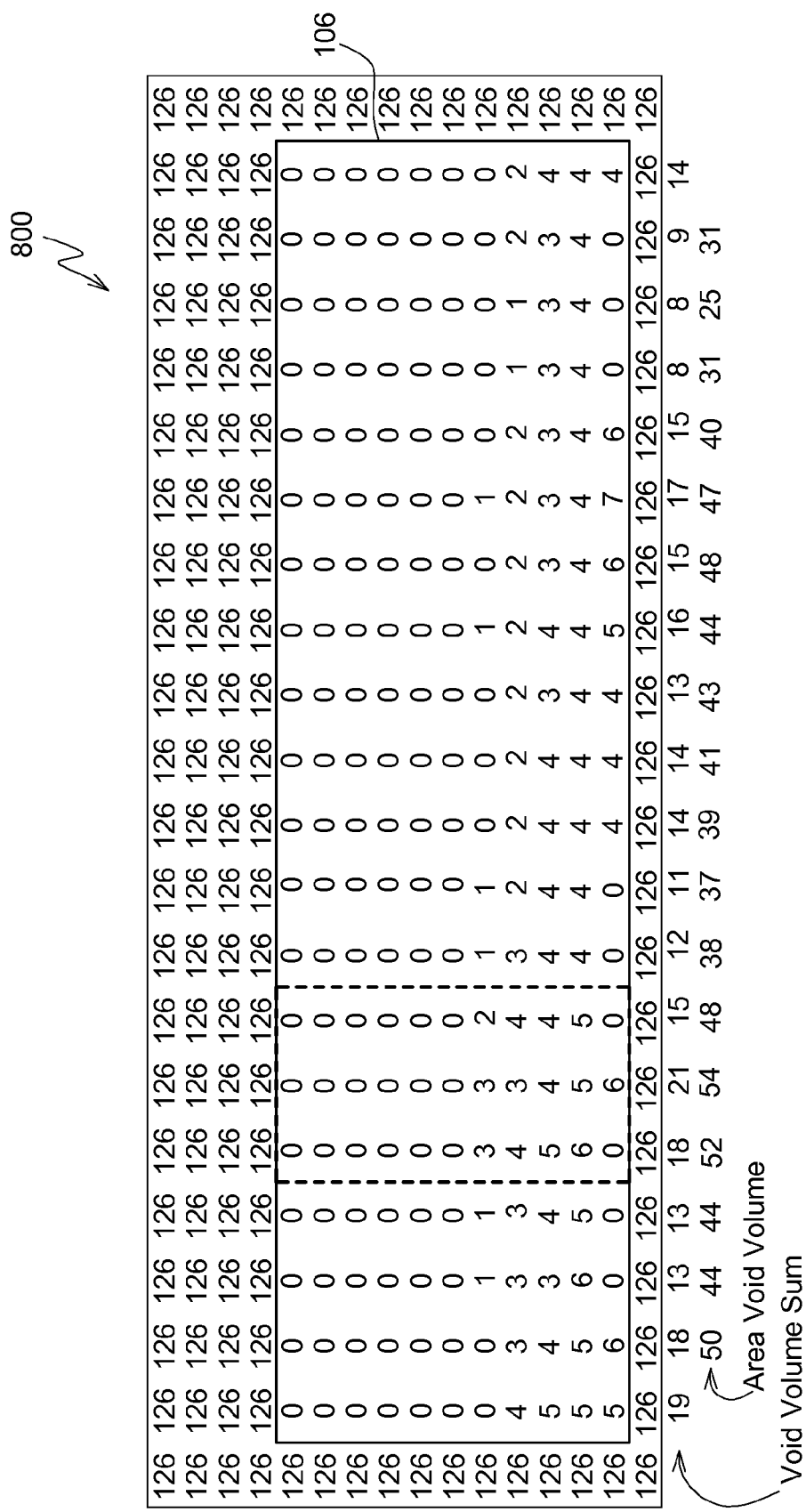
FIG. 10 is the example fill model of FIG. 8A with example void volume calculations from the fill data of FIG. 9.

FIG. 10 shows void volume levels for each cell of the fill model 800. Void volume represents the difference between the fill level set point (e.g., 4) and the actual fill level of a cell, for cells in which the fill level is less than the fill level set point. Thus, the void volume represents the volume of material that must be filled into a cell for the fill level of the cell to equal the fill level set point.

There are many different ways to identify a void. In one example in conjunction with FIG. 7, a void is defined as an area (e.g., a collection of cells 804) of the storage portion 106 that has an average fill level less than the fill level set point and a total void volume above a predetermined value. In other words, for an area to be classified as a void, the area must not be full and must require a certain amount of material to be transferred into it until it is considered full. In other examples, other mathematical relationships for void identification relating to fill level may be used. Typically, harvesting machines have a very high material flow rate. Thus, the criterion for identifying voids should ensure that the identified voids are sufficiently sized so that an attempt to fill the void does not result in over-filling, which may result in material spillage.

In the example depicted in FIGS. 9 and 10, voids are determined with respect to a predetermined number of adjacent columns having respective fill levels below the fill level set point and having a total void volume above a predetermined value. The manner in which voids are identified is carefully designed with respect to the tolerance of control systems of the transferring vehicle 100 (e.g., the spout module 308 and the steering system 362) and the material flow rate of the agricultural material being transferred from the transferring vehicle 100 to the storage portion 106 of the receiving vehicle 102 via the spout 112. Other examples utilize alternative methods of identifying voids to take into account higher or lower control tolerances of systems of various transferring vehicles 100. Moreover, it is desirable to transfer material via the spout 112 at the maximum flow rate of the spout 112 throughout the unloading process. Therefore, the manner in which voids are identified should ensure that voids are at least a particular two-dimensional size (e.g., cover at least a minimum area) and at least a particular three-dimensional volume, such that the material being transferred to the void at the maximum flow rate of the spout 112 does not overfill the void or adjacent sections of the storage portion 106 before the spout 112 is commanded to another section of the storage portion 106.

To identify voids, the image processing module first determines the fill levels of each of the cells 804 of the storage portion 106 based on the image data provided by the first and/or second imaging devices 126, 128. Next, the average fill level is calculated for each column 806. If a column contains an unreadable value, the unreadable value may be ignored, or may be assigned the average fill level of the remaining cells 804 within the column 806. In this example, three adjacent columns must have an average fill level below the fill level set point in order for the area comprising the three adjacent columns to be considered a void. In the example of FIG. 9, each of the three adjacent columns that define the void area have an average fill level of 3, which is less than the fill level set point, which is 4 in this example. Next, the total void volume of the area is calculated. If the total void volume of the area comprising the three adjacent columns is greater than a predetermined value, which in this example is 50, the area is classified as a void. As shown in FIG. 10, each of the three adjacent columns that define the void area have a total void volume of 54 (18+21+15=54), which is greater than the predetermined value, which is 50 in this example. Thus, the area is classified as a void.

In other examples, fewer or more columns may be considered in identifying voids. In certain examples, the number of columns required for a void may be adjusted based on an "aggressiveness factor." Requiring a greater number of columns for void classification results in a less aggressive fill strategy because fewer voids will be identified. Accordingly, requiring fewer columns for void classification results in a more aggressive fill strategy because more voids will be identified, which will result in a more uniform fill profile. FIG. 8D shows an example void that is identified in conjunction with the system of FIGS. 9 and 10 as described above.

While an example manner of implementing the system 300 of FIGS. 4-5B is illustrated in FIGS. 8A-14, one or more of the elements, processes and/or devices illustrated in FIGS. 8A-14 may be combined, divided, re-arranged, omitted, eliminated and/or implemented in any other way. Further, the image processing module 302, the container module 306, the spout module 308, the alignment module 310, the arbiter 312, the user interface processing module 326, the material profile module 314, the guidance modules 360, 510, the coordination modules 342, 512, the master/slave controller 340, the slave/master controller 508, the mode controller 346, and/or, more generally, the example system 300 of FIGS. 1-5B may be implemented by hardware, software, firmware and/or any combination of hardware, software and/or firmware. Thus, for example, any of the example the image processing module 302, the container module 306, the spout module 308, the alignment module 310, the arbiter 312, the user interface processing module 326, the material profile module 314, the guidance modules 360, 510, the coordination modules 342, 512, the master/slave controller 340, the slave/master controller 508, the mode controller 346, and/or, more generally, the example system 300 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example image processing module 302, the container module 306, the spout module 308, the alignment module 310, the arbiter 312, the user interface processing module 326, the material profile module 314, the guidance modules 360, 510, the coordination modules 342, 512, the master/slave controller 340, the slave/master controller 508, and the mode controller 346 are hereby expressly defined to include a tangible computer readable storage device or storage disk such as a memory, a digital versatile disk (DVD), a compact disk (CD), a Blu-ray disk, etc. storing the software and/or firmware. Further still, the example system 300 of FIGS. 1-5B may include one or more elements, processes and/or devices in addition to, or instead of, those illustrated in FIGS. 8A-14, and/or may include more than one of any or all of the illustrated elements, processes and devices.

A flowchart representative of example processes, which may be implemented by machine readable instructions, for implementing the system 300 of FIGS. 1-5B is shown in FIGS. 8-14. In this example, the machine readable instructions comprise a program for execution by a processor such as the processor 1512 shown in the example processor platform 1500 discussed below in connection with FIG. 15. The program may be embodied in software stored on a tangible computer readable storage medium such as a CD-ROM, a floppy disk, a hard drive, a digital versatile disk (DVD), a Blu-ray disk, or a memory associated with the processor 1512, but the entire program and/or parts thereof could alternatively be executed by a device other than the processor 1512 and/or embodied in firmware or dedicated hardware. Further, although the example program is described with reference to the flowcharts illustrated in FIGS. 8-14, many other methods of implementing the example system 300 may alternatively be used. For example, the order of execution of the blocks may be changed, and/or some of the blocks described may be changed, eliminated, or combined.

As mentioned above, the example processes of FIGS. 8A-14 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 8A-14 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

Figure 11:
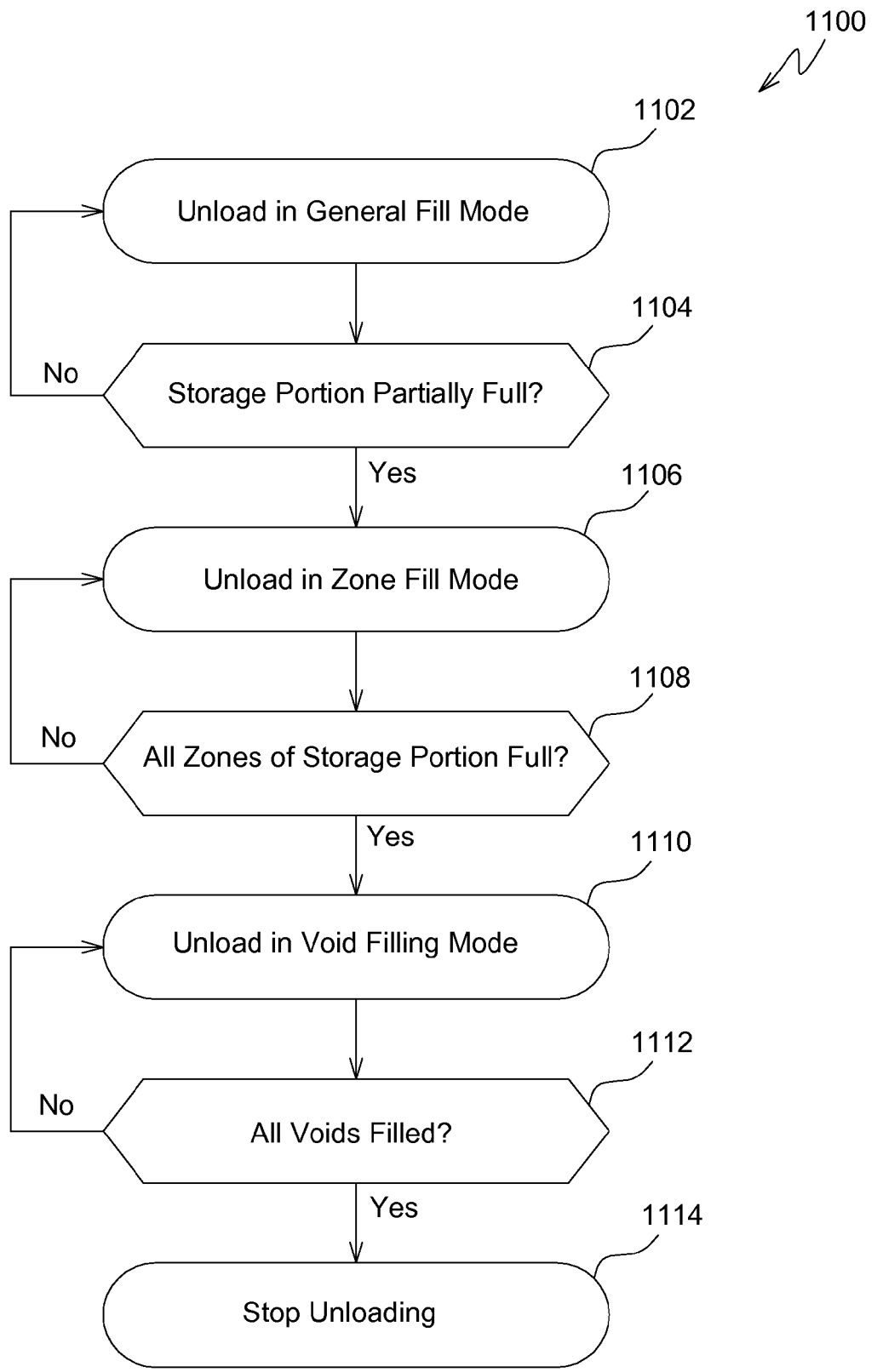
FIG. 11 is a flowchart of an example fill strategy.

FIG. 11 depicts an example material transfer filling sequence 1100 that utilizes a general fill mode 1102, a zone fill mode 1106, and a void fill mode 1110 in sequence. The procedure for identifying voids as described above may be used in conjunction with the example filling sequence 1100. In other examples, the system 300 may utilize additional or fewer fill modes. In the example filling sequence 1100, the operator fills the storage portion 106 in the general fill mode 1102 until a partial fill threshold is met at block 1104, at which point the storage portion 106 is considered partially full. For example, a partial fill threshold may be met when the storage portion 106 is two-thirds full or three-quarters full. Once the partial fill threshold is met, the transferring vehicle 100 enters the zone filling mode 1106, in which each zone is filled until the average fill level in each zone reaches the fill level set point at block 1108, such that all of the zones are considered full. Upon completion, the transferring vehicle 100 enters the void filling mode 1110, in which any remaining voids are identified and filled at block 1112. Once all of the voids are filled, the transferring vehicle 100 stops material transfer at block 1114.

Although the example filling sequence 1100 is described with the general fill mode 1102, the zone fill mode 1106, and the void fill mode 1110 performed in series, the respective fill modes may be performed in any order or combination. For example, in a filling sequence 1100, block 1108 may require that a single zone is considered full before entering the void filling mode at block 1110. The void filling mode 1110 may then be performed on that zone until it is considered full at block 1112, at which point the system may revert to block 1106 to fill the next zone.

Figure 12:
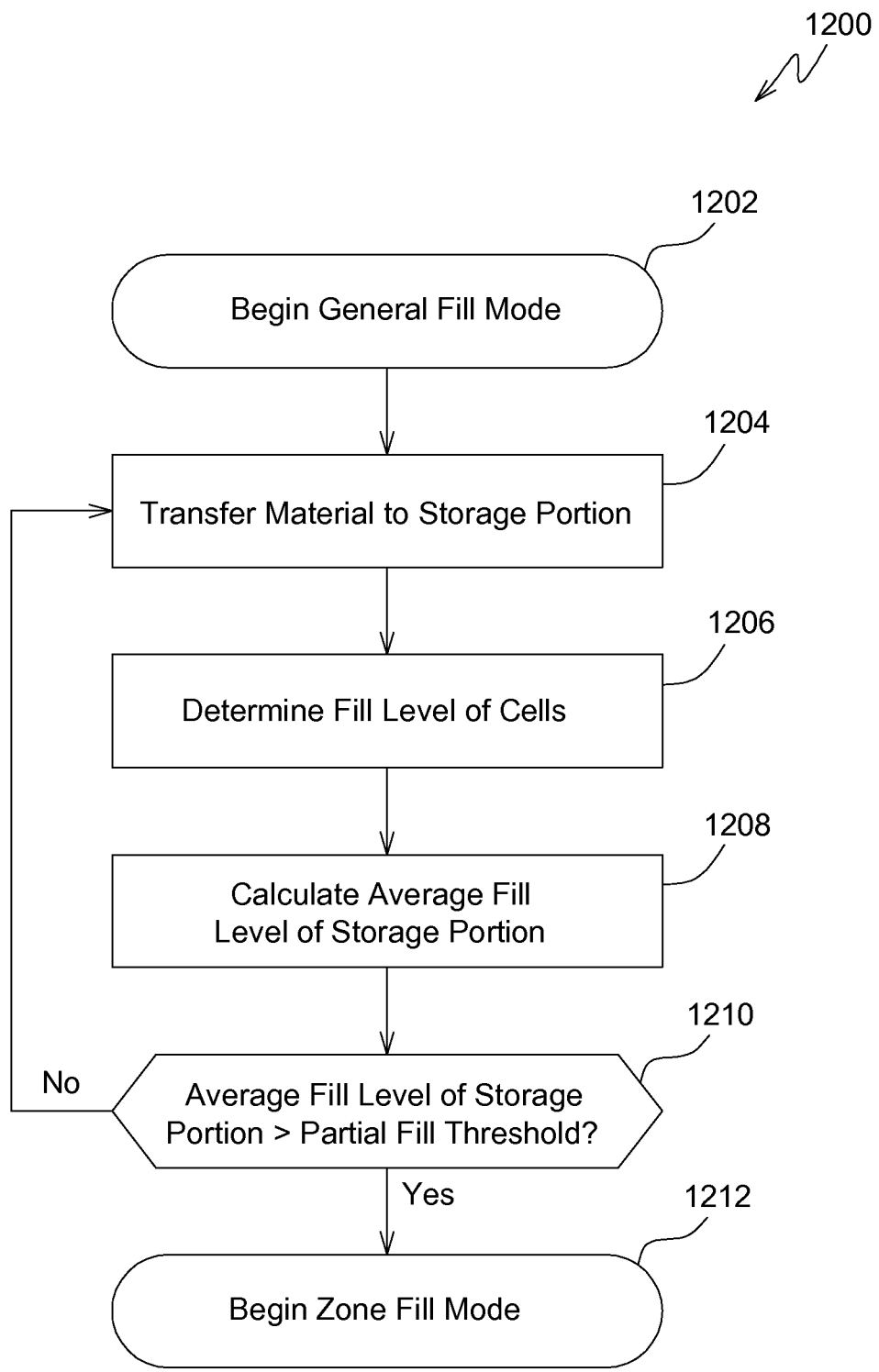
FIG. 12 is a flowchart of an example general fill mode.

FIG. 12 illustrates a general fill mode 1200, 1202. In this example the operator of the transferring vehicle 100 unloads agricultural material into the receiving vehicle 102 in the general fill mode at block 1204. At block 1206, the image processing module 302 analyzes signals from the first and/or second imaging devices 126, 128 to determine the material fill level for each cell 804 of the fill model 800. At block 1208, the image processing module 302 calculates the average fill level of the entire storage portion 106. At block 1210, the average fill level of the storage portion 106 is compared to a partial fill threshold. If the average fill level is less than the desired partial fill threshold, the transferring vehicle 100 continues to transfer agricultural material into the storage portion 106. Once the average fill level is greater than or equal to the partial fill threshold, at block 1212, the general fill mode 1200 is complete and the transferring vehicle 100 begins the zone fill mode. The optional mode controller 346 may control fill modes. The general fill mode may be fully automated, semi-automated, or manual (e.g., operator-directed manual). In a fully automated mode, the system 300 may fill the storage portion 106 in one or more controlled locations. In a manual mode, the operator controls the fill location. A semi-automated mode may include controls to prevent spillage. For example, the system 300 may include controls to sense if the spout 112 is near the perimeter 120 of the storage portion 106, to prevent an operator from moving the spout 112 beyond the perimeter 120 and/or to stop material transfer if the spout 112 moves too close to the perimeter 120.

Figure 13:
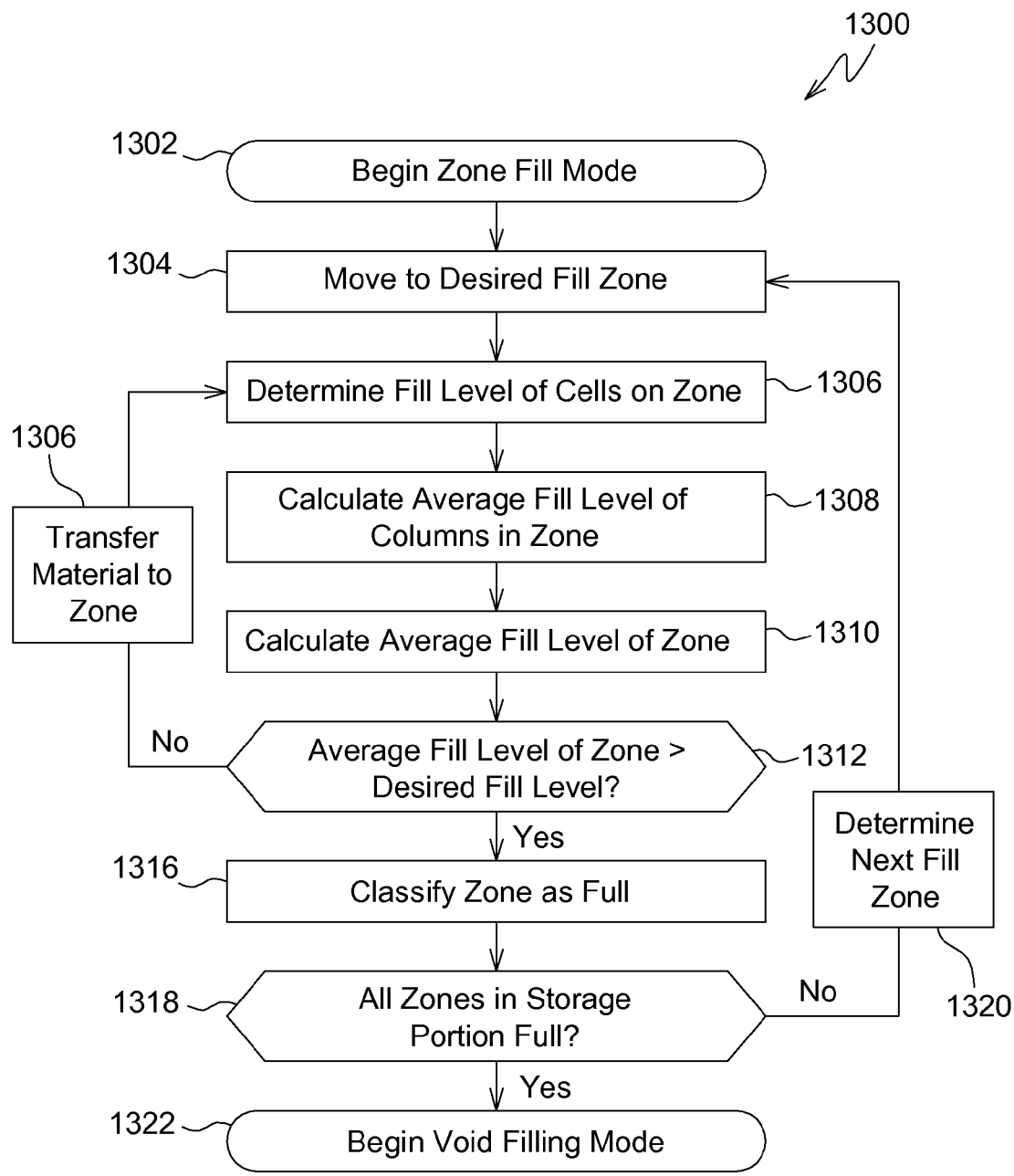
FIG. 13 is a flowchart of an example zone fill mode.

FIG. 13 illustrates an example zone fill mode 1300, 1302. At block 1304, the image processing module 302 determines the first desired fill zone and moves the spout 112 to the desired fill zone. In one example, the first desired fill zone is the zone at the end of the storage portion 106 nearest the current position of the spout 112. Blocks 1306-1310 are then performed as explained above in conjunction with FIGS. 8A-8D and 9-10. At block 1312, the image processing module 302 determines whether the average fill level of the zone is greater than the desired fill level. If not, at block 1314, the transferring vehicle 100 fills the zone and recalculates fill levels at blocks 1306-1310 until the average fill level of the zone is greater than the desired fill level, at which time, the zone is classified as full at block 1316. At block 1318, the image processing module 302 considers whether all of the zones are full. If not, at block 1320, it determines the next fill zone. In one example, the next fill zone may be the zone adjacent the current zone. In another example, the transferring vehicle 100 may begin at the center zone and selectively move outward. Each zone is filled until all of the zones are classified as full, at which point, the transferring vehicle 100 begins void filling mode at block 1322. In other examples, the transferring vehicle 100 begins the void filling mode at block 1322 when fewer than all of the zones are classified as full.

Figure 14:
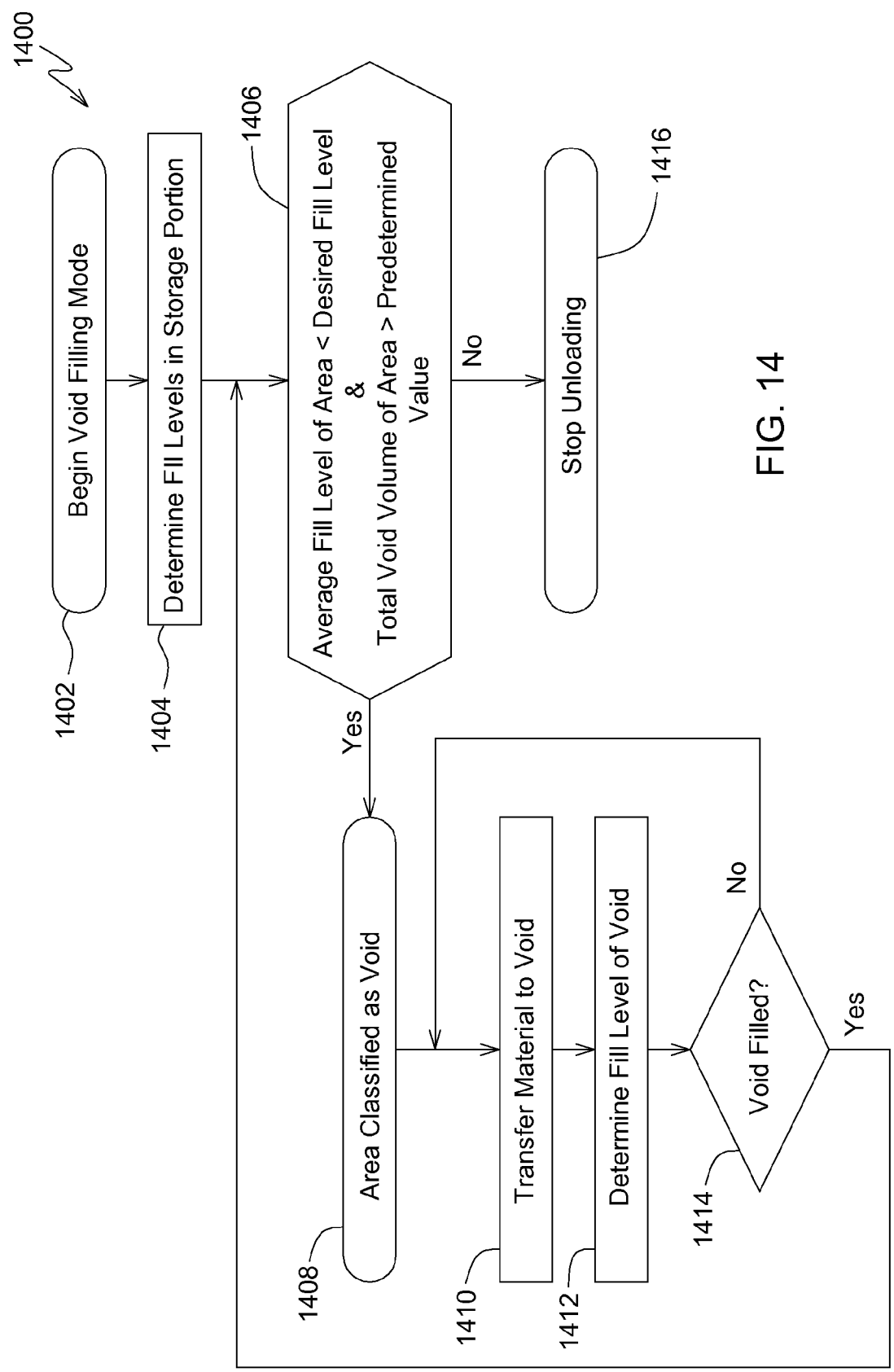
FIG. 14 is a flowchart of an example void fill mode.

FIG. 14 illustrates an example void filling mode 1400, 1402. At block 1404, the image processing module 302 determines the fill levels and void volumes as explained above in conjunction with FIGS. 8A-8D and 9-10. At block 1406, the image processing system searches for voids. As explained above, the system may define a void in many different ways. In one example, an area is considered a void when the average fill level in the area is less than a desired fill level and the total void volume of the area is greater than a predetermined value. In another example, an area is considered a void when the average fill level of each of a predetermined number of adjacent columns is less than a desired fill level and the total void volume of the predetermined number of adjacent columns is greater than a predetermined value. If the result of block 1406 is "yes," the area is classified as a void in block 1408. In block 1410, the void is filled. The fill level is determined in block 1412 and the void continues to be filled until, in block 1414, it is determined to be full. The criteria that are used to define a void may also be used to determine whether the void is full. In another example, other criteria are used to determine whether the void is full. For example, the total void volume requirement for defining a void may be lower than that for determining whether the void is full. Once the void is filled, the image processing module 302 searches for more voids and performs blocks 1408-1414 on any additional voids. Once no voids are identified, the filling mode ends at block 1416 and the transferring vehicle 100 stops material from being transferred to the storage portion 106.

Example void filling modes 1400 may include further steps to control the order in which voids are filled. In one example, the void filling mode 1400 may command the spout 112 to sweep from back-to-front or front-to-back and selectively fill voids as they are identified. In another example, the void filling mode 1400 may begin by filling the void with the largest void volume and sequentially filling smaller voids until all voids are filled. Certain examples utilize a control strategy that minimizes actuation energy of the spout 112 by minimizing movement of the spout 112. Other examples may restrict the void filling mode to portions of a zone depending on the material distribution within the storage portion 106. In an example in which the void filling mode 1400 is entered within a zone prior to all of the zones being considered full, the void filling mode 1400 may ignore portions of a zone that are adjacent cells or columns having lower fill levels. Otherwise, voids may be falsely identified when grain is merely flowing into an empty zone. Subsequent void filling modes 1400 may consider the previously ignored portions.

In each of the fill modes described above, the image processing module 302 may determine the fill level of the storage portion 106 continuously as material is being transferred. This allows the system 300 to adaptively control the fill location based on the actual dynamic fill levels of material within the storage portion. One challenge with determining fill level from images taken by imaging devices is in determining the fill level in the area to which material is being transferred. To address this challenge, the image processing module 302 may estimate the change in fill level in an area to which material is being transferred by considering the flow rate of the material being transferred and the amount of transfer time. The volumetric flow rate of the unloading auger of many combines is known. Depending on the model of the combine, material transfer may occur at a rate of 4-6 bushels per second. Typically, self-propelled forage harvesters have a mass flow sensor on the spout that measures the mass flow rate of material that is transferred to a receiving vehicle 102. Assuming a relatively constant density of forage, the volumetric flow rate and, hence, the volume of material transferred could be calculated. In operation, the image processing module 302 would consider the fill level or void volume of an area prior to unloading in that area, as well as the fill level or void volume of adjacent areas. Once the transferring vehicle 100 begins transferring material to the area, the image processing module 302 may model the expected dynamic fill level of the area by considering the material flow rate, unloading time, and the expected flow conditions of the material to adjacent areas.

Figure 15:
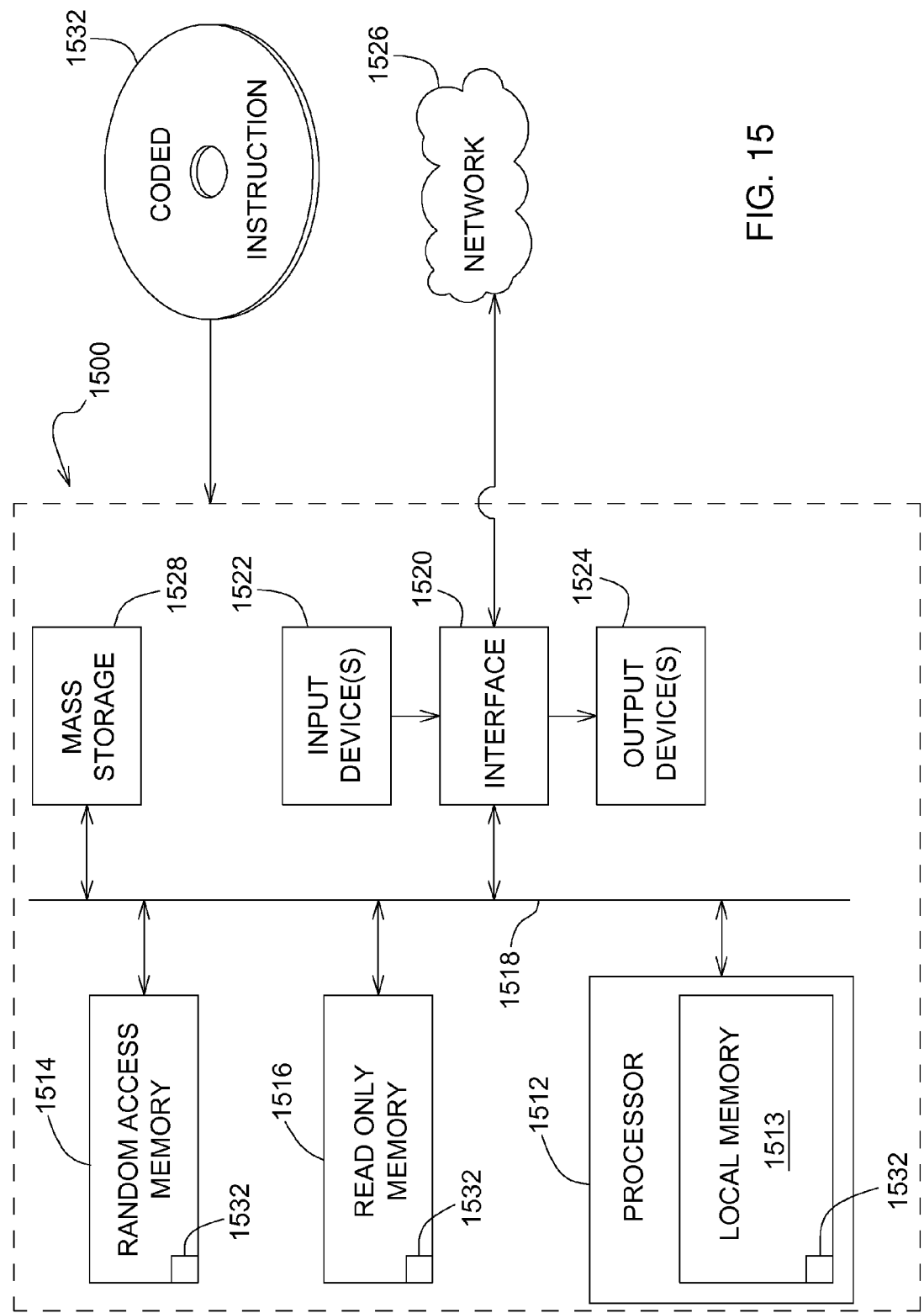
FIG. 15 is a block diagram of an example processor platform to execute or utilize the machine vision-augmented guidance system.

FIG. 15 is a block diagram of an example processor platform 1500 capable of executing the instructions of FIGS. 8-14 to implement the system 300 of FIGS. 1-5B. The processor platform 1500 can be, for example, an electronic control module (e.g., a vehicle control module or an engine control module), a server, a personal computer, a mobile device (e.g., a cell phone, a smart phone, a tablet such as an iPad™), a personal digital assistant (PDA), an Internet appliance or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors or controllers from any desired family or manufacturer.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, one or more input devices 1522 are connected to the interface circuit 1520. The input device(s) 1522 permit(s) a user to enter data and commands into the processor 1512. The input device(s) can be implemented by, for example, a knob, a lever, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1520 of the illustrated example, thus, typically includes a graphics driver card, a graphics driver chip or a graphics driver processor.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL), a telephone line, coaxial cable, a cellular telephone system, etc.).

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and digital versatile disk (DVD) drives.

The coded instructions 1532 of FIGS. 8-14 may be stored in the mass storage device 1528, in the volatile memory 1514, in the non-volatile memory 1516, and/or on a removable tangible computer readable storage medium such as a CD or DVD.

From the foregoing, it will appreciate that the above disclosed methods and apparatus of detecting and filling voids improves operational efficiency of harvesting agricultural material by optimally filling storage portions with agricultural material, improves safety by automating at least a portion of the material unloading process so that the operator of a harvesting machine can focus his attention on harvesting, reduces grain spillage, prevents damage to equipment by evenly distributing load imparted on the equipment by the agricultural material, and reduces harvesting time by facilitating seamless unloading while harvesting.

Although certain example methods, apparatus and articles of manufacture have been disclosed herein, the scope of coverage of this patent is not limited thereto. On the contrary, this patent covers all apparatuses, methods and articles of manufacture fairly falling within the scope of the appended claims either literally or under the doctrine of equivalents.

What is claimed is:

1. A system for facilitating transfer of agricultural material, the system comprising:
    a transferring vehicle comprising a propelled portion for propelling the transferring vehicle and a spout for transferring the agricultural material to a storage portion of a receiving vehicle, the spout having a discharge portion;
    a first imaging device associated with the transferring vehicle and to face towards the storage portion of the receiving vehicle, the first imaging device to collect first image data;
    an image processing module to estimate an observed fill level of the storage portion based on the first image data and to identify a multimodal distribution of multiple peaks of the agricultural material in the storage portion, the image processing module configured to identify at least one void in the distribution and an associated target position in an opening directly above the at least one void; and
    a controller configured to trigger shifting of the discharge portion of the spout to the target position to fill the at least one void in the distribution in a void filling mode when the multimodal distribution is identified.

2. The system of claim 1, wherein the image processing module is to identify a series of voids in the agricultural material in the storage portion of the receiving vehicle and a corresponding target above each of the series of voids to facilitate alignment of the discharge portion of the spout above each of the series of voids to fill the voids in the agricultural material.

3. The system of claim 1, wherein the controller is to be inhibited from entering into the void filling mode if the distribution, detectable by the first image data, does not qualify as the multimodal distribution of multiple peaks of agricultural material.

4. The system of claim 1, wherein the controller is to be inhibited from entering into the void filling mode if the observed fill level does not meet or exceed a predetermined partial fill level.

5. A method of transferring agricultural material, the method comprising:
    collecting image data by an imaging device facing towards a storage portion of a receiving vehicle, the storage portion of the receiving vehicle capable of storing agricultural material transferred to the storage portion from a transferring vehicle via a spout;
    identifying a multimodal distribution of multiple peaks of the agricultural material;
    while the agricultural material is being transferred to the storage portion, processing the image data to determine a fill level profile of the agricultural material within the storage portion;
    based on the fill level profile, identifying a first void within the storage portion; and
    commanding the spout to a first position to direct the agricultural material to the first void when the multimodal distribution has been identified.

6. The method of claim 5, further comprising:
    estimating a dynamic void volume of the first void as a function of time and at least one of a volumetric flow rate or a mass flow rate of the agricultural material that is being transferred; and
    in response to the dynamic void volume of the first void reaching a fill level set point, commanding the spout to a second position to fill a second void.

7. The method of claim 5, wherein processing the image data includes defining a plurality of cells, a grouping of cells comprises a column, a grouping of columns comprises a zone, and the fill level profile of the agricultural material is determined by estimating a fill level of each of the plurality of cells.

8. The method of claim 7, wherein processing the image data includes determining a void volume of a cell that is a difference between the fill level set point and the fill level of the cell, when the fill level is less than the fill level set point.

9. The method of claim 8, wherein processing the image data includes determining a second void that comprises a predetermined number of adjacent columns, and wherein a total void volume of the cells within the predetermined number of adjacent columns is greater than a predetermined value.

10. The method of claim 9, wherein the spout is commanded such that an average fill level of each of the predetermined number of adjacent columns comprising the first void is less than a fill level set point.

11. The method of claim 5, wherein commanding the spout to the first position is further based on at least one of an initial spout position relative to the first void, and a void volume of the first void.

12. The method of claim 5, further including when the fill level of a cell is unreadable, assigning the fill level of the unreadable cell an average fill level of the cells within a zone of the unreadable cell.

13. The method of claim 5, wherein the image processing module estimates fill levels continuously as the agricultural material is transferred to the storage portion.

14. The method of claim 5, wherein the commanding of the spout to the position to direct the agricultural material to the voids is prohibited until a total fill level of the agricultural material within the storage portion exceeds a predetermined partial fill level.

15. The method of claim 5, further comprising commanding the receiving vehicle to a position to direct the agricultural material to the first void, wherein the spout and the receiving vehicle are selectively commanded to respective positions based on a fill strategy.

16. A system, comprising:
a transferring vehicle having a spout for transferring agricultural material to a storage portion of a receiving vehicle;
an imaging device associated with the transferring vehicle and facing towards the storage portion of the receiving vehicle, the imaging device collecting imaging data;
an image processing module operable to:
based on the imaging data, estimate fill levels of agricultural material within the storage portion,
identify a multimodal distribution of multiple peaks of the agricultural material,
identify an area of the storage portion as targeted to fill, and
identify a first void within the targeted area; and
a controller in communication with the image processing module and configured to command the spout to a position to direct the agricultural material to the first void when the controller identifies the multimodal distribution.

17. The system of claim 16, wherein the image processing module is to determine a void volume of a zone that is a difference between a fill level set point and a fill level of the zone, when the fill level is less than the fill level set point.

18. The system of claim 17, wherein the image processing module is configured to estimate a dynamic void volume of the first void as a function of time and at least one of a volumetric flow rate or a mass flow rate; and wherein the controller is configured to, in response to the dynamic void volume of the first void approaching the fill level set point, command the spout to a second position to fill a second void.

19. The system of claim 17, wherein the imaging processing module is to identify the area as targeted to fill when an average fill level of an area is less than a fill level set point, and a total void volume of the area is greater than a predetermined value.

20. The system of claim 17, wherein the imaging processing module is to identify the area as targeted to fill when an average fill level of each of a predetermined number of adjacent zones within the area is less than a fill level set point, and a total void volume of the predetermined number of adjacent zones is greater than a predetermined value.

21. The system of claim 17, wherein the position is to be determined based on at least one of an initial spout position relative to the first void, and a void volume of the first void.

22. The system of claim 17, wherein the image processing module is to estimate the fill levels for each of a plurality of cells within the storage portion, wherein a group of cells comprises a zone, a group of zones comprises an area, and a group of areas comprises the storage portion; and wherein the voids comprise at least one cell.

23. The system of claim 22, wherein, when the fill level of a cell is unreadable, the fill level of the unreadable cell is to be assigned an average fill level of the cells within the zone of the unreadable cell.

24. The system of claim 17, wherein the image processing module is to estimate fill levels continuously as the agricultural material is transferred to the storage portion.

25. The system of claim 17, wherein the controller is prohibited from commanding the spout to the position to direct the agricultural material to the void until a total fill level of the agricultural material within the storage portion exceeds a predetermined partial fill level.

26. The system of claim 17, wherein the controller is in communication with the receiving vehicle and is configured to command the receiving vehicle to a position to direct the agricultural material to the first void, wherein the spout and the receiving vehicle are selectively commanded to respective positions based on a fill strategy.

27. A system for facilitating transfer of agricultural material, the system comprising:
a transferring vehicle comprising a propelled portion for propelling the transferring vehicle and a spout for transferring the agricultural material to a storage portion of a receiving vehicle, the spout having a discharge portion;
a first imaging device associated with the transferring vehicle and facing towards the storage portion of the receiving vehicle, the first imaging device collecting first image data;
an image processing module to estimate an observed fill level of the storage portion based on the first image data and to estimate a distribution of agricultural material in the storage portion, the image processing module configured to identify at least one void in the distribution and an associated target position in an opening directly above the at least one void, wherein the image processing module identifies a multimodal distribution of multiple peaks of agricultural material of the distribution in the storage portion; and
a controller configured to trigger shifting of the discharge portion of the spout to the target position to fill the void in the distribution in a void filling mode, wherein the controller is to be inhibited from entering into the void filling mode if the distribution, detectable by the first image data, does not qualify as the multimodal distribution.

* * * * *